United States Patent
Loyd et al.

(10) Patent No.: US 11,732,121 B2
(45) Date of Patent: *Aug. 22, 2023

(54) ELASTOMERIC PROPYLENE-ALPHA-OLEFIN-DIENE TERPOLYMER COMPOSITIONS

(71) Applicant: ExxonMobil Chemical Patents Inc., Baytown, TX (US)

(72) Inventors: Scott H. Loyd, League City, TX (US); Rainer Kolb, Kingwood, TX (US); Narayanaswami Dharmarajan, Houston, TX (US); Andy H. Tsou, Houston, TX (US); Zhifeng Bai, Houston, TX (US); James N. Coffey, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 232 days.

This patent is subject to a terminal disclaimer.

(21) Appl. No.: 16/976,678

(22) PCT Filed: Mar. 18, 2019

(86) PCT No.: PCT/US2019/022700
§ 371 (c)(1),
(2) Date: Aug. 28, 2020

(87) PCT Pub. No.: WO2019/182949
PCT Pub. Date: Sep. 26, 2019

(65) Prior Publication Data
US 2021/0047505 A1 Feb. 18, 2021

Related U.S. Application Data

(60) Provisional application No. 62/644,718, filed on Mar. 19, 2018.

(51) Int. Cl.
| | |
|---|---|
| *C08L 23/16* | (2006.01) |
| *C08F 210/18* | (2006.01) |
| *C08F 4/659* | (2006.01) |
| *C08F 4/6592* | (2006.01) |
| *C08F 210/02* | (2006.01) |
| *C08F 210/06* | (2006.01) |
| *C08F 210/08* | (2006.01) |
| *C08F 236/20* | (2006.01) |
| *C08K 3/04* | (2006.01) |
| *C08K 3/22* | (2006.01) |
| *C08K 5/00* | (2006.01) |
| *C08K 5/098* | (2006.01) |
| *C08L 91/00* | (2006.01) |
| *F16H 7/02* | (2006.01) |

(52) U.S. Cl.
CPC ............ *C08L 23/16* (2013.01); *C08F 4/6592* (2013.01); *C08F 4/65912* (2013.01); *C08F 210/02* (2013.01); *C08F 210/06* (2013.01); *C08F 210/08* (2013.01); *C08F 210/18* (2013.01); *C08F 236/20* (2013.01); *C08K 3/04* (2013.01); *C08K 3/22* (2013.01); *C08K 5/0025* (2013.01); *C08K 5/098* (2013.01); *C08L 91/00* (2013.01); *F16H 7/023* (2013.01); *C08K 2003/2296* (2013.01); *C08L 2205/035* (2013.01); *C08L 2310/00* (2013.01)

(58) Field of Classification Search
CPC .... C08F 210/18; C08L 23/16; C08L 2205/02; C08L 2205/025
See application file for complete search history.

(56) References Cited

U.S. PATENT DOCUMENTS

| | | | |
|---|---|---|---|
| 5,571,868 A | 11/1996 | Datta et al. | |
| 5,654,370 A | 8/1997 | Datta et al. | |
| 7,199,189 B2 | 4/2007 | Ravishankar et al. | |
| 7,390,866 B2* | 6/2008 | Datta ................... | D01D 5/0985 |
| | | | 524/554 |
| 7,605,217 B2 | 10/2009 | Datta et al. | |
| 7,867,433 B2 | 1/2011 | Jacob et al. | |
| 7,928,165 B2 | 4/2011 | Datta et al. | |
| 8,013,093 B2 | 9/2011 | Datta et al. | |
| 8,765,832 B2 | 7/2014 | Sunny et al. | |
| 8,841,383 B2 | 9/2014 | Rodgers et al. | |
| 9,796,795 B2 | 10/2017 | Canich et al. | |
| 10,336,845 B2* | 7/2019 | Tsou ..................... | C08K 3/013 |

(Continued)

FOREIGN PATENT DOCUMENTS

| | | | | |
|---|---|---|---|---|
| EP | 0990675 A1 | 4/2000 | | |
| EP | 2541621 A1 | 1/2013 | | |
| EP | 2724841 A1 | 4/2014 | | |
| JP | H11292236 A | 10/1999 | | |
| WO | WO 2016/053541 A1 * | 4/2016 | ................ | C08L 9/00 |
| WO | 2018/190940 A1 | 10/2018 | | |

OTHER PUBLICATIONS

J.R. Beatty, Rubber Chemistry and Technology, 42, 1041 (1969).
G.R. Hamed, Rubber Chemistry and Technology, 54, 578 (1981).

*Primary Examiner* — Rip A Lee

(57) ABSTRACT

A propylene-α-olefin-diene (PEDM) terpolymer may comprise 75 to 95 wt % propylene, 5 to 20 wt % α-olefin, and 0.5 to 5 wt % diene, said wt % based on the weight of the PEDM terpolymer. The propylene-α-olefin-diene terpolymer may be blended with an ethylene-based copolymer and optionally a variety of additives to form an elastomeric composition. An exemplary elastomeric composition includes 5 to 40 parts by weight per hundred parts by weight rubber (phr) of the PEDM terpolymer, 60 to 95 phr of the ethylene-based copolymer, and optionally additives like carbon black, zinc dimethacrylate, paraffinic oil, zinc oxide, and/or zinc stearate.

22 Claims, 8 Drawing Sheets

(56) References Cited

U.S. PATENT DOCUMENTS

| | | | |
|---|---|---|---|
| 10,882,981 B2 * | 1/2021 | Blok | C08L 7/00 |
| 10,894,841 B2 * | 1/2021 | Canich | C08F 210/16 |
| 11,053,381 B2 * | 7/2021 | Dharmarajan | C08L 23/16 |
| 11,390,734 B2 * | 7/2022 | Dharmarajan | C08L 23/16 |
| 2004/0260025 A1 | 12/2004 | Ravishankar et al. | |
| 2005/0107534 A1 | 5/2005 | Datta et al. | |
| 2008/0188600 A1 | 8/2008 | Westwood et al. | |
| 2012/0309862 A1 | 12/2012 | Jacob | |
| 2013/0098494 A1 | 4/2013 | Yajima et al. | |
| 2015/0368450 A1 | 12/2015 | Sato | |
| 2016/0333963 A1 | 11/2016 | South et al. | |
| 2017/0233513 A1 | 8/2017 | Tsou et al. | |
| 2017/0292013 A1 | 10/2017 | Blok et al. | |
| 2017/0362350 A1 | 12/2017 | Canich et al. | |
| 2019/0284311 A1 | 9/2019 | Canich et al. | |
| 2019/0284318 A1 | 9/2019 | Canich et al. | |
| 2021/0371634 A1 * | 12/2021 | Dharmarajan | C08L 23/16 |

* cited by examiner

ELASTOMERIC PROPYLENE-ALPHA-OLEFIN-DIENE TERPOLYMER COMPOSITIONS

CROSS-REFERENCE TO RELATED APPLICATIONS

This application is a National Phase application claiming priority to PCT application Serial No. PCT/US2019/022700, filed Aug. 26, 2019, which claims the benefit of priority from U.S. Provisional Application No. 62/644,718, filed Mar. 19, 2018, which are incorporated by reference in their entirety.

FIELD

The present disclosure relates to polymer compositions comprising ethylene based copolymers, propylene-α-olefin-diene (PEDM) terpolymers, transmission belts, other articles comprising such blends of copolymers and terpolymers.

BACKGROUND

Power transmission belts include V-belts, flat belts, toothed or synchronous belts and multi-ribbed belts. Belt construction typically includes an elastomeric belt body, spiraled or helically wound tension cord or other textile tensile member embedded in the belt body, and often other textile reinforcements embedded in the belt body or covering one or more of the belt surfaces.

The elastomeric belt body may include one or more vulcanized rubber compositions, or an elastomeric composition, such as a thermoplastic elastomer composition. Elastomer compositions have traditionally included ethylene-propylene-(optional diene) polymers, known as EP(D)M polymers or EP(D)M rubbers. Elastomeric compositions based on EP(D)M polymers need to possess the right combination of processability and physical properties both in the vulcanized and unvulcanized state to satisfy manufacturing and end use application requirements.

Two noteworthy properties currently lacking in vulcanized EP(D)M compositions for use of the compositions for transmission belt applications are tack and green strength, especially the balance between the two. Tack is the maximum force required to separate two identical composition samples (e.g., rubber specimens), while green strength is the tensile modulus measured at 25% or higher extension of a composition sample (e.g., a rubber specimen).

From a manufacturing standpoint, for unvulcanized EP(D)M compositions, the uncured elastomeric sheets coming off the calender roll should possess adequate tack to permit splicing of individual sheets to form a sheet that is several times larger than the width of the calendered sheet when it exits the roll. The unvulcanized elastomer should also have adequate green strength to be rolled onto a mandrel without sagging. However, it has been found that EP(D)M polymers have insufficient tack and green strength for use as (and manufacture of) transmission belts.

Tack and green strength are influenced by polymer crystallinity. Lower crystallinity leads to greater tack. For example, tack of an EP(D)M composition can be modified by lowering the ethylene content of the EP(D)M polymer and thereby reducing crystallinity. However, lower crystallinity reduces green strength. Furthermore, lower crystallinity is detrimental to properties such as abrasion resistance, which is also an important property for transmission belts. Indeed, design of a single polymer (or polymer composition) that has these contrasting polymer features to meet the tack and green strength requirements presents a challenge in creating an acceptable polymer synthesis process.

Hydrocarbon tackifiers have been used as additives in EP(D)M compositions to enhance tack. However, non-hydrogenated tackifiers co-vulcanize with the EP(D)M, but do not display long-term heat resistance due, at least in part, to their unsaturation. Hydrogenated tackifiers show better thermal stability; however, they are more expensive potentially detrimental to curing and mechanical properties due to uncrosslinking with EP(D)M. Moreover, tackifying resins directionally increase EP(D)M compound costs, when incorporated as an additive without replacing the EP(D)M polymer component.

Some potentially relevant background references include WIPO Publication Nos. WO 2016/053541, WO 2016/053542, WO 2016/114914; U.S. Pat. Nos. 5,654,370; 5,571,868; 7,199,189; 7,390,866; 7,605,217; 7,867,433; 7,928,165; 8,013,093; 8,765,832; and 8,841,383; U.S. Patent Publication No. 2013/050488; as well as J. R. Beatty, *Rubber Chem. & Tech.*, 42, 1041 (1969) and G. R. Hamed, *Rubber Chem. & Tech.*, 54, 578 (1981).

There is a need for polymers and polymer compositions having adequate tack and green strength for use in transmission belts.

SUMMARY

Embodiments of the present disclosure include elastomeric compositions comprising a minor component (e.g., from 5 to 40 parts by weight per hundred parts by weight rubber (phr)) of a propylene-α-olefin-diene (PEDM) terpolymer and a major component (e.g., from 60 to 95 phr) of an ethylene-based copolymer (e.g., an EP(D)M). The PEDM may comprise comprising 75 to 95 wt % propylene, 5 to 20 wt % α-olefin (preferably ethylene), and 0.5 to 5 wt % diene, said wt % based on the weight of the PEDM terpolymer. The ethylene-based copolymer may comprise ethylene, one or more $C_3$ to $C_{12}$ α-olefins, and, optionally, one or more dienes; wherein an ethylene content of the ethylene-based copolymer (in wt % on the basis of total weight of the ethylene-based copolymer) is different from an ethylene content of the PEDM terpolymer (in wt % on the basis of total weight of the PEDM terpolymer). It has been discovered that compositions of the present disclosure provide improved tack and/or green strength. The improved tack and/or green strength make the compositions ideal for use in, e.g., transmission belts, and in particular to provide improved properties and/or superior manufacturing processes for transmission belts.

A method of producing the elastomeric composition may include producing a master batch at a first temperature, the master batch comprising the ethylene-based copolymer, the PEDM terpolymer, and optional additives; and mixing a curative and/or a crosslinking agent into the master batch at a second temperature that is lower than the first temperature. When additives are used, some methods of producing the elastomeric composition may include blending the ethylene-based copolymer and additives first; and then, mixing the PEDM terpolymer with the resultant blend. The curative or crosslinking additives may be added simultaneously with the PEDM terpolymer or after the PEDM terpolymer.

The PEDM is produced with a catalyst system and an activator. The catalyst compound is represented by formula (I):

$$T_y Cp'_m MG_n X_q \qquad \text{(I)},$$

wherein:

Cp' is a tetrahydroindacenyl group (such as tetrahydro-s-indacenyl or tetrahydro-as-indacenyl) which is optionally substituted or unsubstituted, provided that when Cp' is tetrahydro-s-indacenyl: 1) the 3 and/or 4 positions are not aryl or substituted aryl, 2) the 3 position is not directly bonded to a group 15 or 16 heteroatom, 3) there are no additional rings fused to the tetrahydroindacenyl ligand, 4) T is not bonded to the 2-position, and 5) the 5, 6, or 7-position (preferably the 6 position) is geminally disubstituted, preferably with two $C_1$-$C_{10}$ alkyl groups;

M is a group 3, 4, 5, or 6 transition metal, preferably group 4 transition metal, for example titanium, zirconium, or hafnium;

T is a bridging group;

y is 0 or 1, indicating the absence or presence of T;

G is a heteroatom group represented by the formula $JR^i_{z-y}$ where J is N, P, O or S, $R^i$ is a $C_1$ to $C_{100}$ hydrocarbyl group, and z is 2 when J is N or P, and z is 1 when J is O or S;

X is a leaving group;

m=1; n=1, 2 or 3; q=1, 2 or 3; and the sum of m+n+q is equal to the oxidation state of the transition metal (preferably 2, 3, 4, 5, or 6, preferably 4).

DETAILED DESCRIPTION

Figure 1:
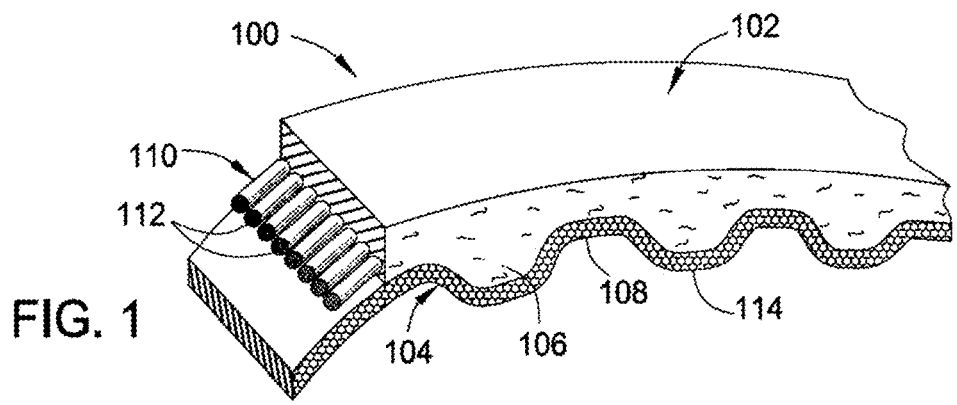
FIG. 1 is a fragmented perspective view of a transmission belt in accordance with some embodiments of the present disclosure.

Embodiments of the present disclosure include compositions comprising a minor amount (e.g., from 5 phr to 40 phr of a composition) of a first polymer that is a PEDM terpolymer and a major amount (e.g., from 60 phr to 95 phr of a composition) of a second polymer that is an ethylene-based copolymer. It has been discovered that compositions of the present disclosure provide improved tack and/or green strength for use in transmission belts. These improved properties provide transmission belts having improved properties for better use and improved manufacturing of the transmission belts.

Definitions

As used herein, the term "copolymer" is meant to include polymers having two or more monomers. The term "polymer" as used herein includes, but is not limited to, homopolymers, copolymers, terpolymers, etc., and alloys and blends thereof. The term "terpolymer" as used herein refers to a polymer synthesized from three different monomers. Terpolymers, in some embodiments, may be produced (1) by mixing all three monomers at the same time or (2) by sequential introduction of the different comonomers. The mixing of comonomers may be done in one, two, or possible three different reactors in series and/or in parallel. The term "polymer" as used herein also includes impact, block, graft, random, and alternating copolymers. The term "polymer" shall further include all possible geometrical configurations unless otherwise specifically stated. Such configurations may include isotactic, syndiotactic and random (i.e., atactic) symmetries.

The term "blend" as used herein refers to a mixture of two or more polymers. Blends may be produced by, for example, solution blending, melt mixing, or compounding in a shear mixer. Solution blending is common for making adhesive formulations comprising baled butyl rubber, tackifier, and oil. Then, the solution blend is coated on a fabric substrate, and the solvent evaporated to leave the adhesive.

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit". Different monomers are discussed herein, including propylene monomers, ethylene monomers, and diene monomers.

As used herein, the term "ethylene-based copolymer," includes copolymers derived from ethylene, an α-olefin having 3 or more carbon atoms (such as 3-12 carbon atoms, such as 6-10 carbon atoms), and optionally a diene. In preferred embodiments, the ethylene-based copolymer is an ethylene-propylene copolymer or ethylene-propylene-diene polymer.

As used herein, an "ethylene-propylene-diene polymer" (EP(D)M) is defined to be a copolymer having an ethylene content (derived from ethylene monomers) and a propylene content (derived from propylene monomers), and optionally a diene content (derived from diene monomers, preferably non-conjugated diene monomers), where the ethylene content is from 40 wt % to 95 wt % (such as 41 wt % to 95 wt %, such as 45 wt % to 90 wt %, such as 50 wt % to 80 wt %), the diene content is 0 wt % to 15 wt %, and the balance (i.e., the remaining wt % of the polymer) is primarily (e.g., allowing for minor impurities) or entirely propylene content, based on the weight of the polymer. An EP(D)M may have a Mooney viscosity, (ML, 1+4 @ 125° C.) (measured according to ASTM D1646-17) of 15 to 100. The terms "EP(D)M" and "EPDM" are used interchangeably and have the same meaning, unless specified otherwise in context (e.g., where the polymer is referred to as definitively comprising diene monomer(s)).

The term "propylene-α-olefin-diene terpolymer" as used herein includes a polymer derived from propylene, an α-olefin (preferably ethylene), and diene monomers. Propylene-α-olefin-diene terpolymers may be referred to by the shorthand PEDM, even though α-olefins instead of, or in addition to, ethylene are contemplated as comonomers in such terpolymers, and/or polyenes instead of, or in addition to, dienes are contemplated. Preferably, the PEDM terpolymer comprises a propylene content (derived from propylene monomers), an ethylene content (derived from ethylene monomers) and a diene content (derived from diene monomers). PEDMs can have an ethylene content from 5 wt % to 20 wt % based on the weight of the polymer, such as from 7 wt % to 15 wt %.

As used herein, "phr" means "parts per hundred parts rubber," where the "rubber" is the total rubber content of the composition. Herein, both PEDM and ethylene-based copolymer (e.g., EP(D)M) are considered to contribute to the total rubber content, such that in compositions where both are present, the "total rubber" is the combined weight of PEDM and ethylene-based copolymer. Thus, for example, a composition having 30 parts by weight of PEDM and 70 parts by weight of ethylene-based copolymer may be referred to as having 30 phr PEDM and 70 phr ethylene-based copolymer. Other components added to the composition are calculated on a phr basis—that is, addition of 50 phr of oil means, e.g., that 50 g of oil are present in the composition for every 100 g of PEDM and ethylene-based copolymer combined. Unless specified otherwise, phr should be taken as phr on a weight basis.

As used herein, "tensile strength" means the amount of stress applied to a sample to break the sample. It can be expressed in Pascals or pounds per square inch (PSI). ASTM D412-16 can be used to determine tensile strength of a polymer.

"Mooney viscosity" as used herein is the Mooney viscosity of a polymer or polymer composition. The polymer composition analyzed for determining Mooney viscosity should be substantially devoid of solvent. For instance, the sample may be placed on a boiling-water steam table in a hood to evaporate a large fraction of the solvent and unreacted monomers, and then, dried in a vacuum oven overnight (12 hours, 90° C.) prior to testing, in accordance with laboratory analysis techniques, or the sample for testing may be taken from a devolatilized polymer (i.e., the polymer post-devolatilization in industrial-scale processes). Unless otherwise indicated, Mooney viscosity is measured using a Mooney viscometer according to ASTM D1646-17, but with the following modifications/clarifications of that procedure. First, sample polymer is pressed between two hot plates of a compression press prior to testing. The plate temperature is 125° C.+/−10° C. instead of the 50+/−5° C. recommended in ASTM D1646-17, because 50° C. is unable to cause sufficient massing. Further, although ASTM D1646-17 allows for several options for die protection, should any two options provide conflicting results, PET 36 micron should be used as the die protection. Further, ASTM D1646-17 does not indicate a sample weight in Section 8; thus, to the extent results may vary based upon sample weight, Mooney viscosity determined using a sample weight of 21.5+/−2.7 g in the D1646-17 Section 8 procedures will govern. Finally, the rest procedures before testing set forth in D1646-17 Section 8 are 23+/−3° C. for 30 min in air; Mooney values as reported herein were determined after resting at 24+/−3° C. for 30 min in air. Samples are placed on either side of a rotor according to the ASTM D1646-17 test method; torque required to turn the viscometer motor at 2 rpm is measured by a transducer for determining the Mooney viscosity. The results are reported as Mooney Units (ML, 1+4 @ 125° C.), where M is the Mooney viscosity number, L denotes large rotor (defined as ML in ASTM D1646-17), 1 is the pre-heat time in minutes, 4 is the sample run time in minutes after the motor starts, and 125° C. is the test temperature. Thus, a Mooney viscosity of 90 determined by the aforementioned method would be reported as a Mooney viscosity of 90 MU (ML, 1+4 @ 125° C.). Alternatively, the Mooney viscosity may be reported as 90 MU; in such instance, it should be assumed that the just-described method is used to determine such viscosity, unless otherwise noted. In some instances, a lower test temperature may be used (e.g., 100° C.), in which case Mooney is reported as Mooney Viscosity (ML, 1+4 @ 100° C.), or @ T° C. where T is the test temperature.

Numerical ranges used herein include the numbers recited in the range. For example, the numerical range "from 1 wt % to 10 wt %" includes 1 wt % and 10 wt % within the recited range.

Compositions

Compositions of the present disclosure comprise a minor amount (e.g., from 5 phr to 40 phr of a composition) of a first polymer that is a random PEDM terpolymer and a major amount (e.g., from 60 phr to 95 phr of a composition) of a second polymer that is a random ethylene-based copolymer. Compositions of the present disclosure can comprise the first polymer that is a PEDM terpolymer in an amount of from 5 phr to 40 phr. Further examples of the amount of PEDM terpolymer suitable for use include: from 6 phr to 35 phr, from 7 phr to 30 phr, from 8 phr to 25 phr, from 9 phr to 20 phr, from 10 phr to 20 phr, or from 10 phr to 15 phr, based on the total amount of polymer content of the composition.

First Polymers: PEDM Terpolymers

PEDM terpolymers of the present disclosure have from 0.5 to 5 wt % polyene (preferably diene) content, 5 to 20 wt % $C_2$ or $C_4$ to $C_{12}$ α-olefin (preferably ethylene) content, and 75 to 95 wt % propylene content, said wt % s based on the weight of the PEDM terpolymer.

PEDM terpolymers of the present disclosure can have a heat of fusion ($H_f$) of less than 1 J/g. In at least one embodiment, PEDM terpolymers are amorphous. Additionally or alternatively, PEDM terpolymers can have atactic propylene sequences. Alternatively, PEDM terpolymers can have syndiotactic r diad sequences. In at least one embodiment, a PEDM terpolymer has a glass transition temperature (Tg) from −40° C. to −2° C., such as from −35° C. to −30° C.

PEDM terpolymers of the present disclosure comprise from 5 wt % to 20 wt % $C_2$ or $C_4$ to $C_{12}$ α-olefin comonomer (preferably ethylene), based on the weight of the PEDM terpolymer. Other preferred ranges of α-olefin (such as ethylene) content include from 6 wt % to 19 wt %, such as from 7 wt % to 18 wt %, such as from 8 wt % to 17 wt %, such as from 9 wt % to 16 wt %, such as from 10 wt % to 15 wt %, such as from 5 wt % to 15 wt %, such as from 7 wt % to 15 wt %, such as from 7 wt % to 13 wt %, for example about 10 wt %, based on the weight of the PEDM terpolymer. In yet other embodiments, the α-olefin (preferably ethylene) content may be within the lower range from 5 to 12 wt %, such as from 5 to 10 wt % or even 5 to 8 wt %, based on the weight of the PEDM terpolymers.

The polyenes, as noted, are preferably (but not necessarily) dienes. Suitable dienes may be conjugated or non-conjugated. Preferably, the dienes are non-conjugated. Dienes include 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD); and combinations thereof. Preferably, the diene is ENB or VNB.

Preferably, a PEDM terpolymer comprises a diene content of from 0.5 wt % to 10 wt %, such as 0.5 wt % to 5 wt %, such as from 0.8 wt % to 4 wt %, such as from 1 wt % to 3 wt %, such as from 2 wt % to 4 wt %, for example about 3 wt %, based on the weight of the terpolymer. In at least one embodiment, the diene is 5-ethylidene-2-norbornene content in an amount of from 0.5 wt % to 5 wt %, such as from 0.5 wt % to 4 wt %, such as from 1 wt % to 3.5 wt %, such as from 0.5 wt % to 3.0 wt %, for example about 3 wt % based on the weight of the polymer.

PEDM terpolymers of the present disclosure may have a weight average molecular weight (Mw) of 5,000,000 or less, a number average molecular weight (Mn) of 3,000,000 or less, a z-average molecular weight (Mz) of 10,000,000 or less.

Molecular weights (number average molecular weight (Mn), weight average molecular weight (Mw), and z-average molecular weight (Mz)) can be determined using a Polymer Laboratories Model 220 high temperature gel-permeation chromatography size-exclusion chromatography (GPC-SEC) equipped with on-line differential refractive index (DRI), light scattering (LS), and viscometer (VIS) detectors. Three Polymer Laboratories PLgel 10 m Mixed-B columns are used for separation using a flow rate of 0.54 ml/min and a nominal injection volume of 300 μL. The detectors and columns are contained in an oven maintained at 135° C. The stream emerging from the SEC columns is directed into the miniDAWN (Wyatt Technology, Inc.) optical flow cell and then into the DRI detector. The viscometer is inside the SEC oven, positioned after the DRI detector. The details of these detectors as well as their calibrations are described by, for example, T. Sun, P. Brant, R. R. Chance, and W. W. Graessley, *Macromolecules, vol.* 34(19), pp. 6812-6820, (2001).

Solvent for the SEC experiment can be prepared by dissolving 6 grams of butylated hydroxy toluene (BHT) as an antioxidant in 4 liters of Aldrich reagent grade 1, 2, 4-trichlorobenzene (TCB). The TCB mixture is then filtered through a 0.7 micrometer glass pre-filter and subsequently through a 0.1 micrometer Teflon filter. The TCB is then degassed with an online degasser before entering the SEC.

Polymer solutions are prepared by placing dry polymer in a glass container, adding the desired amount of BHT stabilized TCB, then heating the mixture at 160° C. with continuous agitation for about 2 hours. All quantities are measured gravimetrically. The TCB densities used to express the polymer concentration in mass/volume units can be 1.463 g/mL at 22° C. and 1.324 g/mL at 135° C. The injection concentration can be from 1.0 to 2.0 mg/mL, with lower concentrations being used for higher molecular weight samples. Prior to running each sample the DRI detector and the injector should be purged. Flow rate in the apparatus can then be increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc),$$

where $K_{DRI}$ is a constant determined by calibrating the DRI with a series of mono-dispersed polystyrene standards with molecular weight ranging from 600 to 10M, and (dn/dc) is the refractive index increment for the system. The refractive index, n=1.500 for TCB at 145° C. and λ=690 nm. For purposes of this invention and the claims thereto (dn/dc) =0.1048 for ethylene-propylene copolymers, and (dn/dc) =0.01048−0.0016ENB for EPDM comprising ENB as the diene, where ENB is the ENB content in wt % in the ethylene-propylene-diene terpolymer. Where other non-conjugated polyenes are used instead of (or in addition to) ENB, the ENB is taken as weight percent of total non-conjugated polyenes. The value (dn/dc) is otherwise taken as 0.1 for other polymers and copolymers, including PEDM terpolymers. Units of parameters used throughout this description of the SEC method are as follows: concentration is expressed in g/cm³, molecular weight is expressed in g/mol, and intrinsic viscosity is expressed in dL/g.

The light scattering (LS) detector can be, for example, a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the DRI analysis, $A_2$ is the second virial coefficient (for purposes of this invention, $A_2$=0.0015 for ethylene homopolymer and $A_2$=0.0015−0.00001EE for ethylene-propylene copolymers, where EE is the ethylene content in weight percent in the ethylene-propylene copolymer. $P(\theta)$ is the form factor for a mono-disperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and λ=690 nm.

PEDM terpolymers of the present disclosure may have an Mw of from 5,000 g/mol to 5,000,000 g/mol, such as from 10,000 g/mol to 1,000,000 g/mol, such as from 20,000 g/mol to 500,000 g/mol, such as from 50,000 g/mol to 400,000 g/mol. The PEDM terpolymer may have an Mn of 2,500 g/mol to 2,500,000 g/mol, such as from 5,000 g/mol to 500,000 g/mol, such as from 10,000 g/mol to 250,000 g/mol, such as from 25,000 g/mol to 200,000 g/mol. The PEDM terpolymer may have an Mz of 10,000 g/mol to 7,000,000 g/mol, such as from 50,000 g/mol to 1,000,000 g/mol, such as from 80,000 g/mol to 700,000 g/mol, such as from 100,000 g/mol to 500,000 g/mol. For purposes of this application, where DRI and LS measurements conflict, LS measurements should be used for Mw and Mz, while DRI measurements should be used for Mn.

The molecular weight distribution index (MWD=(Mw/Mn)) of PEDM terpolymers of the present disclosure may be from 1.5 to 40. For example, a PEDM terpolymer may have an MWD from 1.5 to 40, such as from 1.8 to 20, such as from 2.0 to 10, such as from 2.0 to 5, such as from 3 to 4.5. In one or more embodiments, the MWD of a PEDM terpolymer is 1.8 to 5, such as from 1.8 to 3. Further, although MWD (polydispersity) is taken as Mw/Mn, where DRI and LS measurements conflict, MWD should be determined as Mw (measured by LS)/Mn (measured by DRI), or $Mw_{LS}/Mn_{DRI}$.

PEDM terpolymers of the present disclosure may have a density of from 0.85 g/cm³ to 0.92 g/cm³, or from 0.87 g/cm³ to 0.90 g/cm³, or from 0.88 g/cm³ to 0.89 g/cm³, at room temperature as measured per the ASTM D1505-10 test method.

PEDM terpolymers of the present disclosure may have a melt flow rate (MFR, 2.16 kg weight at 230° C.), equal to or greater than 0.2 g/10 min as measured according to the ASTM D1238-13. In at least one aspect, the MFR (2.16 kg at 230° C.) is from 0.5 g/10 min to 200 g/10 min, such as from 1 g/10 min to 100 g/10 min, such as from 2 g/10 min to 30 g/10 min, such as from 5 g/10 min to 30 g/10 min, such as from 10 g/10 min to 30 g/10 min, such as from 10 g/10 min to 25 g/10 min. In at least one aspect, MFR (2.16 kg at 230° C.) is about 7.5 g/10 min PEDM terpolymers of the present disclosure may have a Mooney viscosity (ML, 1+4 @ 125° C.) of less than 100, such as less than 75, such as less than 60, such as less than 30, such as less than 20, such as less than 15, for example about 14 MU. For instance, in PEDM according to some embodiments, Mooney viscosity may be within the range from 5, 10, or 12 MU to 20, 25, or 30 MU.

PEDM terpolymers of the present disclosure preferably have atactic polypropylene sequences. Also or instead, they are preferably amorphous, meaning they will exhibit no melting peak when subjected to differential scanning calorimetry (DSC) testing. Alternatively, PEDM according to some embodiments may exhibit minor melting peak, such that they may be observed to have Hf<1 J/g according to the DSC methodology described herein. Further, where a PEDM exhibits any melting peak, such peak may be a single peak, or the PEDM may show secondary melting peaks adjacent to the principal peak. For purposes herein, such secondary melting peaks are considered together as a single melting point, with the highest of these peaks (relative to baseline as described herein) being considered as the melting point of the PEDM terpolymer.

According to yet further embodiments, the crystallinity of PEDM terpolymers may be expressed in terms of percentage of crystallinity (i.e., % crystallinity), as determined according to the DSC procedure described herein. Although PEDM according to certain embodiments is amorphous (and may therefore be said to have 0% crystallinity), if a PEDM according to various other embodiments exhibits any crystallinity, it preferably has a % crystallinity of from 0.1% to 5%, preferably 0.1% to 3%. (The degree of crystallinity is determined by dividing (i) heat of fusion measured by (ii) the heat of fusion for 100% crystalline polyethylene, which has the value of 293 J/g (B. Wunderlich, Thermal Analysis, Academic Press, 1990, pp. 417-431).)

The DSC procedures for determining melting point (Tm) and/or heat of fusion (Hf) (or lack thereof) of the PEDM terpolymer include the following. The polymer is pressed at a temperature of from 200° C. to 230° C. in a heated press, and the resulting polymer sheet is hung, under ambient conditions (of 20-23.5° C.), in the air to cool. 6 to 10 mg of the polymer sheet is removed with a punch die. This 6 to 10 mg sample is annealed at room temperature (22° C.) for 80 to 100 hours. At the end of this period, the sample is placed in a DSC (Perkin Elmer Pyris One Thermal Analysis System) and cooled at a rate of about 10° C./min from −30° C. to −50° C. and held for 10 minutes at −50° C. The sample is heated at 10° C./min to attain a final temperature of 200° C. The sample is kept at 200° C. for 5 minutes. Then a second cool-heat cycle is performed, using the same conditions described above. Events from both cycles, "first melt" and "second melt", respectively, are recorded. The thermal output is recorded as the area under the melting peak of the sample, which typically occurs between 0° C. and 200° C. It is measured in Joules and is a measure of the $H_f$ of the polymer. Reference to melting point temperature and Hf herein refers to the first melt.

Further, as mentioned above, where the sample exhibits no melting peak, as in the case of amorphous polymers, it may be said to have no Hf. However, even some amorphous or near-amorphous PEDM samples might exhibit a minor melting peak, e.g., such that Hf on the first melt may be observed as <1 J/g. Therefore, for purposes of the present application, a PEDM may be considered amorphous when it has Hf<1 J/g, or alternatively when it exhibits no discernable melting peak, both observations being taken from a first melt in the above-described DSC procedure.

Dynamic mechanical thermal analysis (DMTA) was used to determine glass transition temperature (Tg). The variation in elastic modulus (E'), loss modulus (E") and tan δ (E"/E') was determined using a DMTA tester such as RSA 3 from TA Instruments. All samples were examined at a constant frequency of 1 Hz and temperature ranging from −70 to 100° C. The temperature at the tan δ maximum is recorded as the glass transition temperature.

PEDM terpolymers of some embodiments can have a glass transition temperature (Tg), as determined by the DMTA procedure described herein, from −45° C. to −2° C., such as from −40° C. to −25° C., −40° C. to −20° C., −35° C. to −25° C., −40° C. to −15° C., or −35° C. to −15° C.; or alternatively from −20° C. to −2° C., such as from −15° C. to −2° C., such as from −10° C. to −2° C., such as from −5° C. to −2° C.

Catalyst Systems

PEDM terpolymers of the present disclosure can be synthesized using a catalyst system comprising at least one catalyst and at least one activator.

Catalyst Compounds

The present disclosure provides polymerization processes where ethylene, $C_{3+}$ olefin (such as $C_3$-$C_{40}$ α-olefin, preferably propylene), ethylene, and diene (such as ENB) are contacted with a catalyst system comprising an activator, optional support, and a catalyst compound. The catalyst compound, optional support and activator may be combined in any order, and are combined typically prior to contacting the catalyst system with the monomer. In at least one embodiment, the catalyst compound is represented by formula (I):

$$T_y Cp'_m MG_n X_q \qquad (I),$$

wherein:

Cp' is a tetrahydroindacenyl group (such as tetrahydro-s-indacenyl or tetrahydro-as-indacenyl) which is optionally substituted or unsubstituted, provided that when Cp' is tetrahydro-s-indacenyl: 1) the 3 and/or 4 positions are not aryl or substituted aryl, 2) the 3 position is not directly bonded to a group 15 or 16 heteroatom, 3) there are no additional rings fused to the tetrahydroindacenyl ligand, 4) T is not bonded to the 2-position, and 5) the 5, 6, or 7-position (preferably the 6 position) is geminally disubstituted, preferably with two $C_1$-$C_{10}$ alkyl groups;

M is a group 2, 3, 4, 5, or 6 transition metal, preferably group 4 transition metal, for example titanium, zirconium, or hafnium (preferably titanium);

T is a bridging group (such as dialkylsilylene, dialkylcarbylene, phen-1,2-diyl, substituted phen-1,2-diyl, cyclohex-1,2-diyl or substituted cyclohex-1,2-diyl). T is preferably $(CR^8R^9)_x$, $SiR^8R^9$ or $GeR^8R^9$ where x is 1 or 2, $R^8$ and $R^9$ are independently selected from hydrogen, substituted or unsubstituted hydrocarbyl, halocarbyl, silylcarbyl and germylcarbyl and $R^8$ and $R^9$ may optionally be bonded together to form a ring structure, and in a particular embodiment, $R^8$ and $R^9$ are not aryl);

y is 0 or 1, indicating the absence or presence of T;

G is a heteroatom group represented by the formula $JR^i_{z-y}$ where J is N, P, O or S, $R^i$ is a $C_1$ to $C_{100}$ hydrocarbyl group (such as a $C_1$ to $C_{20}$ hydrocarbyl group), and z is 2 when J is N or P, and z is 1 when J is O or S (preferably J is N and z is 2) (R' can be a linear, branched or cyclic $C_1$ to $C_{20}$ hydrocarbyl group, preferably independently selected from methyl, ethyl, propyl, butyl, pentyl, hexyl, heptyl, octyl, nonyl, decyl, phenyl, and isomers thereof, including t-butyl, cyclododecyl, cyclooctyl, preferably t-butyl and or cyclododecyl);

X is a leaving group (such as a halide, a hydride, an alkyl group, an alkenyl group or an arylalkyl group) and optionally two or more X may form a part of a fused ring or a ring system; m=1; n=1, 2 or 3; q=1, 2 or 3; and the sum of m+n+q is equal to the oxidation state of the transition metal (preferably 3, 4, 5, or 6, preferably 4); preferably m=1, n=1, q is 2, and y=1.

In at least one embodiment of formula (I), M is a group 4 transition metal (preferably Hf, Ti and/or Zr, preferably Ti). In at least one embodiment of formula (I), $JR^i_{z-y}$ is cyclododecyl amido, t-butyl amido, and or 1-adamantyl amido.

In at least one embodiment of formula (I), each X is, independently, selected from hydrocarbyl radicals having from 1 to 20 carbon atoms, aryls, hydrides, amides, alkoxides, sulfides, phosphides, halides, dienes, amines, phosphines, ethers, and a combination thereof, (two X's may form a part of a fused ring or a ring system), preferably each X is independently selected from halides, aryls and $C_1$ to $C_5$ alkyl groups, preferably each X is a benzyl, methyl, ethyl, propyl, butyl, pentyl, or chloro group.

In at least one embodiment of formula (I), the Cp' group may be substituted with a combination of substituent groups R. R includes one or more of hydrogen, or linear, branched alkyl radicals, or alkenyl radicals, alkynyl radicals, cycloalkyl radicals or aryl radicals, acyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, arylamino radicals, straight, branched or cyclic, alkylene radicals, or combination thereof. In at least one embodiment, substituent groups R have up to 50 non-hydrogen atoms, preferably from 1 to 30 carbon, that can also be substituted with halogens or heteroatoms or the like, provided that when Cp' is tetrahydro-s-indacenyl: 1) the 3 and/or 4 position is not aryl or substituted aryl, 2) the 3-position is not substituted with a group 15 or 16 heteroatom, 3) there are no additional rings fused to the tetrahydroindacenyl ligand, T is not bonded to the 2-position, and 5) the 5, 6, or 7-position (preferably the 6 position) is geminally disubstituted, preferably with two $C_1$-$C_{10}$ alkyl groups. Non-limiting examples of alkyl substituents R include methyl, ethyl, propyl, butyl, pentyl, hexyl, cyclopentyl, cyclohexyl, benzyl or phenyl groups and the like, including all their isomers, for example, tertiary butyl, isopropyl and the like. Other hydrocarbyl radicals include fluoromethyl, fluoroethyl, difluoroethyl, iodopropyl, bromohexyl chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorus, oxygen, tin, sulfur, germanium and the like, including olefins such as, but not limited to, olefinically unsaturated substituents including vinyl-terminated ligands, for example but-3-enyl, prop-2-enyl, hex-5-enyl and the like.

In at least one embodiment of formula (I), the substituent(s) R are, independently, hydrocarbyl groups, heteroatoms, or heteroatom containing groups, such as methyl, ethyl, propyl, butyl, pentyl, hexyl, heptyl, octyl, nonyl, decyl, undecyl, dodecyl or an isomer thereof, or a $C_1$ to $C_{20}$ hydrocarbyl substituted with an N, O, S and or P heteroatom or heteroatom containing group (typically having up to 12 atoms, including the N, O, S and P heteroatoms), provided that when Cp' is tetrahydro-s-indacenyl, the 3 and/or 4 position are not aryl or substituted aryl, the 3 position is not substituted with a group 15 or 16 heteroatom, and there are no additional rings fused to the tetrahydroindacenyl ligand, T is not bonded to the 2-position, and the 5, 6, or 7-position (preferably the 6 position) is geminally disubstituted, preferably with two $C_1$-$C_{10}$ alkyl groups.

In at least one embodiment of formula (I), the Cp' group is tetrahydro-as-indacenyl or tetrahydro-s-indacenyl which may be substituted.

y can be 1 where T is a bridging group containing at least one group 13, 14, 15, or 16 element, in particular boron or a group 14, 15 or 16 element. Examples of suitable bridging groups include P(=S)R*, P(=Se)R*, P(=O)R*, R*$_2$C, R*$_2$Si, R*$_2$Ge, R*$_2$CCR*$_2$, R*$_2$CCR*$_2$CR*$_2$, R*$_2$CCR*$_2$CR*$_2$CR*$_2$, R*C=CR*, R*C=CR*CR*$_2$, R*$_2$CCR*=CR*CR*$_2$, R*C=CR*CR*=CR*, R*C=CR*CR*$_2$CR*$_2$, R*$_2$CSiR*$_2$, R*$_2$SiSiR*$_2$, R*$_2$SiOSiR*$_2$, R*$_2$CSiR*$_2$CR*$_2$, R*$_2$SiCR*$_2$SiR*$_2$, R*C=CR*SiR*$_2$, R*$_2$CGeR*$_2$, R*$_2$GeGeR*$_2$, R*$_2$CGeR*$_2$CR*$_2$, R*$_2$GeCR*$_2$GeR*$_2$, R*$_2$SiGeR*$_2$, R*C=CR*GeR*$_2$, R*B, R*$_2$C—BR*, R*$_2$C—BR*—CR*$_2$, R*$_2$C—O—CR*$_2$, R*$_2$CR*$_2$C—O—CR*$_2$CR*$_2$, R*$_2$C—O—CR*$_2$CR*$_2$, R*$_2$C—O—CR*=CR*, R*$_2$C—S—CR*$_2$, R*$_2$CR*$_2$C—S—CR*$_2$CR*$_2$, R*$_2$C—S—CR*$_2$CR*$_2$, R*$_2$C—S—CR*=CR*, R*$_2$C—Se—CR*$_2$, R*$_2$CR*$_2$C—Se—CR*$_2$CR*$_2$, R*$_2$C—Se—CR*$_2$CR*$_2$, R*$_2$C—Se—CR*=CR*, R*$_2$C—N=CR*, R*$_2$C—NR*—CR*$_2$, R*$_2$C—NR*—CR*$_2$CR*$_2$, R*$_2$C—NR*—CR*=CR*, R*$_2$CR*$_2$C—NR*—CR*$_2$CR*$_2$, R*$_2$C—P=CR*, R*$_2$C—PR*—CR*$_2$, O, S, Se, Te, NR*, PR*, AsR*, SbR*, O—O, S—S, R*N—NR*, R*P—PR*, O—S, O—NR*, O—PR*, S—NR*, S—PR*, and R*N—PR* where R* is hydrogen or a $C_1$-$C_{20}$ containing hydrocarbyl, substituted hydrocarbyl, halocarbyl, substituted halocarbyl, silylcarbyl or germylcarbyl substituent, and optionally two or more adjacent R* may join to form a substituted or unsubstituted, saturated, partially unsaturated or aromatic, cyclic or polycyclic substituent, and optionally any one or more adjacent R* and R' may join to form a substituted or unsubstituted, saturated, partially unsaturated or aromatic, cyclic or polycyclic substituent. Preferred examples for the bridging group T include —CH$_2$—, —CH$_2$CH$_2$—, —SiMe$_2$-, —SiPh$_2$-, —Si(Me)(Ph)-, —Si(CH$_2$)$_3$—, —Si(CH$_2$)$_4$—, —O—, —S—, —N(Ph)-, —P(Ph)-, —N(Me)-, —P(Me)-, —N(Et)-, —N(Pr)—, —N(Bu)-, —P(Et)-, —P(Pr)—, -(Me)$_2$SiOSi(Me)$_2$-, and —P(Bu)-. In a preferred embodiment of the present disclosure, when Cp' is tetrahydro-s-indacenyl and T is R*$_2$Si, then R* is not aryl. In some embodiments, R* is not aryl or substituted aryl.

In at least one embodiment, the catalyst compound is one or more bridged transition metal compounds represented by formula (II):

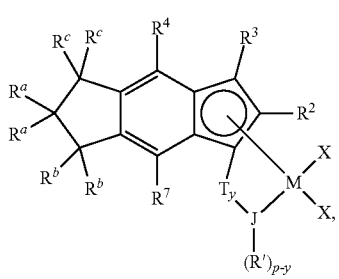

where M is a group 4 metal (such as Hf, Ti or Zr, preferably Ti);
J N, O, S or P;
p is 2 when J is N or P, and is 1 when J is O or S (preferably J is N, y=1, and p=2);
each $R^a$ is independently $C_1$-$C_{10}$ alkyl (alternately a $C_2$-$C_{10}$ alkyl);
each $R^b$ and each $R^c$ is independently hydrogen or a $C_1$-$C_{10}$ alkyl (alternately a $C_2$-$C_{10}$ alkyl);
each $R^2$, $R^3$, $R^4$, and $R^7$ is independently hydrogen, or a $C_1$-$C_{50}$ substituted or unsubstituted hydrocarbyl, halocarbyl, silylcarbyl or germylcarbyl, provided that: 1) $R^3$ and/or $R^4$ are not aryl or substituted aryl, 2) $R^3$ is not directly bonded to a group 15 or 16 heteroatom, and 3) adjacent $R^4$, $R^c$, $R^a$ or $R^7$ do not join together to form a fused ring system;
each R' is, independently, a $C_1$-$C_{100}$ substituted or unsubstituted hydrocarbyl, halocarbyl, silylcarbyl or germylcarbyl; and
T is a bridging group and y is 0 or 1 indicating the absence (y=0) or presence (y=1) of T;
and each X is, independently, a leaving group, or two Xs are joined and bound to the metal atom to form a metallocycle ring, or two Xs are joined to form a chelating ligand, a diene ligand, or an alkylidene.

In at least one embodiment, the catalyst compound is one or more bridged transition metal compounds represented by formula (III):

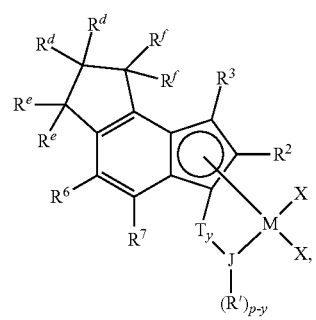

where M is a group 4 metal (such as Hf, Ti or Zr, preferably Ti);
J N, O, S or P;
p is 2 when J is N or P, and is 1 when J is O or S (preferably J is N, y=1, and p=2);
each $R^d$, $R^e$ and $R^f$ are independently hydrogen or a $C_1$-$C_{10}$ alkyl (alternately a $C_2$-$C_{10}$ alkyl);
each $R^2$, $R^3$, $R^6$, and $R^7$ is independently hydrogen, or a $C_1$-$C_{50}$ substituted or unsubstituted hydrocarbyl, halocarbyl, silylcarbyl or germylcarbyl;
each R' is, independently, a $C_1$-$C_{100}$ substituted or unsubstituted hydrocarbyl, halocarbyl, silylcarbyl or germylcarbyl; and
T is a bridging group and y is 0 or 1 indicating the absence (y=0) or presence (y=1) of T;
and each X is, independently, a leaving group, or two Xs are joined and bound to the metal atom to form a metallocycle ring, or two Xs are joined to form a chelating ligand, a diene ligand, or an alkylidene.

In some embodiments of formulae II and III, y is 1 and T is $(CR^8R^9)_x$, $SiR^8R^9$ or $GeR^8R^9$ where x is 1 or 2, $R^8$ and $R^9$ are independently selected from hydrogen or substituted or unsubstituted hydrocarbyl, halocarbyl, silylcarbyl and germylcarbyl and $R^8$ and $R^9$ may optionally be bonded together to form a ring structure.

In at least one embodiment of the present disclosure, each $R^2$, $R^3$, $R^6$, and $R^7$ is independently hydrogen, or a $C_1$-$C_{50}$ substituted or unsubstituted hydrocarbyl, halocarbyl, silylcarbyl or germylcarbyl, preferably methyl, ethyl, propyl, butyl, pentyl, hexyl, heptyl, octyl, nonyl, decyl, undecyl, and dodecyl or an isomer thereof.

In at least one embodiment of the present disclosure, each $R^2$, $R^3$, $R^4$, and $R^7$ is independently hydrogen, or a $C_1$-$C_{50}$ substituted or unsubstituted hydrocarbyl, halocarbyl, silylcarbyl or germylcarbyl, preferably methyl, ethyl, propyl, butyl, pentyl, hexyl, heptyl, octyl, nonyl, decyl, undecyl, and dodecyl or an isomer thereof.

In at least one embodiment of the present disclosure, each $R^a$ or $R^d$ is independently selected from methyl, ethyl, propyl, butyl, pentyl, hexyl, heptyl, octyl, nonyl, decyl, and isomers thereof, preferably methyl and ethyl, preferably methyl.

In at least one embodiment of the present disclosure, each $R^b$, $R^c$, $R^e$ or $R^f$ is independently selected from hydrogen, methyl, ethyl, propyl, butyl, pentyl, hexyl, heptyl, octyl, nonyl, decyl, and isomers thereof, preferably hydrogen or methyl, preferably hydrogen.

In at least one embodiment of the present disclosure, each $R^a$ is independently selected from methyl, ethyl, propyl, butyl, pentyl, hexyl, heptyl, octyl, nonyl, decyl, and isomers thereof, preferably methyl and ethyl, preferably methyl, and each $R^b$ and $R^c$ are independently selected from hydrogen, methyl, ethyl, propyl, butyl, pentyl, hexyl, heptyl, octyl, nonyl, decyl, and isomers thereof, preferably hydrogen or methyl, preferably hydrogen.

In at least one embodiment of the present disclosure, each $R^d$ is independently selected from hydrogen, methyl, ethyl, propyl, butyl, pentyl, hexyl, heptyl, octyl, nonyl, decyl, and isomers thereof, preferably methyl and ethyl, preferably methyl, and each $R^e$ and $R^f$ are independently selected from hydrogen, methyl, ethyl, propyl, butyl, pentyl, hexyl, heptyl, octyl, nonyl, decyl, and isomers thereof, preferably hydrogen or methyl, preferably hydrogen.

In at least one embodiment of the present disclosure, each $R^a$, $R^b$ and $R^c$ are independently selected from hydrogen, methyl, ethyl, propyl, butyl, pentyl, hexyl, heptyl, octyl, nonyl, decyl, and isomers thereof, preferably hydrogen or methyl.

In at least one embodiment of the present disclosure, each $R^d$, $R^e$ and $R^f$ are independently selected from hydrogen, methyl, ethyl, propyl, butyl, pentyl, hexyl, heptyl, octyl, nonyl, decyl, and isomers thereof, preferably hydrogen or methyl.

In at least one embodiment of the present disclosure, R' is a $C_1$-$C_{100}$ substituted or unsubstituted hydrocarbyl, halocarbyl, or silylcarbyl, preferably methyl, ethyl, propyl, butyl, pentyl, hexyl, heptyl, octyl, nonyl, decyl, undecyl, dodecyl, phenyl or an isomer thereof, preferably t-butyl, neopentyl, cyclohexyl, cyclooctyl, cyclododecyl, adamantyl, or norbornyl.

In at least one embodiment of the present disclosure, T is $CR^8R^9$, $R^8R^9C$—$CR^8R^9$, $SiR^8R^9$ or $GeR^8R^9$ where $R^8$ and $R^9$ are independently selected from hydrogen or substituted or unsubstituted hydrocarbyl, halocarbyl, silylcarbyl and $R^8$ and $R^9$ may optionally be bonded together to form a ring structure, preferably each $R^8$ and $R^9$ is independently methyl, ethyl, propyl, butyl, pentyl, hexyl, heptyl, octyl, nonyl, decyl, benzyl, phenyl, methylphenyl or an isomer thereof, preferably methyl, ethyl, propyl, butyl, or hexyl. When $R^8$ and $R^9$ are optionally bonded together preferred bridges include substituted or unsubstituted phen-1,2-diyl, cyclohex-1,2-diyl, cyclopentamethylenesilylene, cyclotetramethylenesilylene, cyclotrimethylenesilylene and dibenzo[b,d]silolyl. Additionally, optionally any one or more adjacent $R^8$ and/or $R^9$ may join to form a substituted or unsubstituted, saturated, partially unsaturated or aromatic, cyclic or polycyclic substituent along with R'.

In at least one embodiment of the present disclosure, at least one of $R^8$ or $R^9$ is not aryl. In at least one embodiment of the present disclosure, $R^8$ is not aryl. In at least one embodiment of the present disclosure, $R^9$ is not aryl. In at least one embodiment of the present disclosure, $R^8$ and $R^9$ are not aryl.

In at least one embodiment of the present disclosure, $R^8$ and $R^9$ are independently $C_1$-$C_{10}$ alkyl, such as methyl, ethyl, propyl, butyl, pentyl, hexyl, heptyl, octyl, nonyl, decyl, or an isomer thereof.

In at least one embodiment of the present disclosure, each $R^2$, $R^3$, $R^4$, and $R^7$ is independently hydrogen or hydrocarbyl. Each $R^2$, $R^3$, $R^4$, and $R^7$ can be independently hydrogen or a $C_1$-$C_{10}$ alkyl, such as methyl, ethyl, propyl, butyl, pentyl, hexyl, heptyl, octyl, nonyl, decyl, or an isomer thereof.

In at least one embodiment of the present disclosure, each $R^2$, $R^3$, $R^6$, and $R^7$ is independently hydrogen or hydrocarbyl. Each $R^2$, $R^3$, $R^6$, and $R^7$ can be independently hydrogen or a $C_1$-$C_{10}$ alkyl, preferably methyl, ethyl, propyl, butyl, pentyl, hexyl, heptyl, octyl, nonyl, decyl, or an isomer thereof.

In at least one embodiment of the present disclosure, $R^2$ is a $C_1$-$C_{10}$ alkyl and $R^3$, $R^4$, and $R^7$ are hydrogen.

In at least one embodiment of the present disclosure, $R^2$ is a $C_1$-$C_{10}$ alkyl and $R^3$, $R^6$, and $R^7$ are hydrogen.

In at least one embodiment of the present disclosure, $R^2$, $R^3$, $R^4$, and $R^7$ are hydrogen. In at least one embodiment of the present disclosure, $R^2$, $R^3$, $R^6$, and $R^7$ are hydrogen.

In at least one embodiment of the present disclosure, $R^2$ is methyl, ethyl, or an isomer of propyl, butyl, pentyl or hexyl, and $R^3$, $R^4$, and $R^7$ are hydrogen. In at least one embodiment of the present disclosure, $R^2$ is methyl, ethyl, or an isomer of propyl, butyl, pentyl or hexyl, and $R^3$, $R^6$, and $R^7$ are hydrogen.

In at least one embodiment of the present disclosure, $R^2$ is methyl and $R^3$, $R^4$, and $R^7$ are hydrogen. In at least one embodiment of the present disclosure, $R^2$ is methyl and $R^3$, $R^6$, and $R^7$ are hydrogen.

In at least one embodiment of the present disclosure, $R^3$ is hydrogen. In at least one embodiment of the present disclosure, $R^2$ is hydrogen.

In at least one embodiment of the present disclosure, $R^2$ and each $R^a$ is independently a $C_1$-$C_{10}$ alkyl and $R^3$, $R^4$, $R^7$ and each $R^6$ and $R^c$ are hydrogen.

In at least one embodiment of the present disclosure, $R^2$ and each $R^d$ is a $C_1$-$C_{10}$ alkyl and $R^3$, $R^6$, $R^7$ and each $R^e$ and $R^f$ are hydrogen.

In at least one embodiment of the present disclosure, $R^2$ and each $R^a$ is independently a methyl, ethyl, propyl, butyl, pentyl, hexyl, heptyl, octyl, nonyl, decyl, or an isomer thereof, and $R^3$, $R^4$, $R^7$ and each $R^b$ and $R^c$ are hydrogen.

In at least one embodiment of the present disclosure, $R^2$ and each $R^d$ is a methyl, ethyl, propyl, butyl, pentyl, hexyl, heptyl, octyl, nonyl, decyl, or an isomer thereof, and $R^3$, $R^6$, $R^7$ and each $R^e$ and $R^f$ are hydrogen.

In at least one embodiment of the present disclosure, R' is $C_1$-$C_{100}$ or $C_1$-$C_{30}$ substituted or unsubstituted hydrocarbyl.

In at least one embodiment of the present disclosure, R' is $C_1$-$C_{30}$ substituted or unsubstituted alkyl (linear, branched, or cyclic), aryl, alkaryl, or heterocyclic group. In at least one embodiment of the present disclosure, R is $C_1$-$C_{30}$ linear, branched or cyclic alkyl group.

In at least one embodiment of the present disclosure, R is methyl, ethyl, or any isomer of propyl, butyl, pentyl, hexyl, heptyl, octyl, nonyl, decyl, undecyl, or dodecyl. In at least one embodiment of the present disclosure, R' is a cyclic or polycyclic hydrocarbyl.

In at least one embodiment of the present disclosure, R' is selected from tert-butyl, neopentyl, cyclohexyl, cycloheptyl, cyclooctyl, cyclononyl, cyclodecyl, cycloundecyl, cyclododecyl, adamantyl, and norbornyl. In at least one embodiment, R' is tert-butyl.

In at least one embodiment of the present disclosure, $R^1$ is selected from tert-butyl, neopentyl, cyclohexyl, cycloheptyl, cyclooctyl, cyclononyl, cyclodecyl, cycloundecyl, cyclododecyl, adamantyl, and norbornyl. In at least one embodiment, $R^1$ is tert-butyl.

In at least one embodiment of the present disclosure, T is selected from diphenylmethylene, dimethylmethylene, 1,2-ethylene, phen-1,2-diyl, cyclohex-1,2-diyl cyclotrimethylenesilylene, cyclotetramethylenesilylene, cyclopentamethylenesilylene, dibenzo[b,d]silolyl, dimethylsilylene, diethylsilylene, methylethylsilylene, and dipropylsilylene.

In at least one embodiment of the present disclosure, each $R^a$ is independently methyl, ethyl, propyl, butyl, pentyl or hexyl. In at least one embodiment of the present disclosure, each $R^a$ is independently methyl or ethyl. Each $R^a$ can be methyl.

In at least one embodiment of the present disclosure, each $R^d$ is independently methyl, ethyl, propyl, butyl, pentyl or hexyl. In at least one embodiment of the present disclosure, each $R^d$ is independently methyl or ethyl. Each $R^d$ can be methyl.

In at least one embodiment of the present disclosure, each $R^d$ and each $R^e$ and $R^f$ are independently hydrogen, methyl, ethyl, propyl, butyl, pentyl or hexyl. In at least one embodiment of the present disclosure, each $R^d$ is independently hydrogen, methyl, or ethyl.

In at least one embodiment of the present disclosure, each $R^b$ and $R^e$ is hydrogen. In at least one embodiment of the present disclosure, each $R^e$ and $R^f$ is hydrogen.

In at least one embodiment of the present disclosure, each X is hydrocarbyl, halocarbyl, or substituted hydrocarbyl or halocarbyl.

In at least one embodiment of the present disclosure, X is methyl, benzyl, or halo where halo includes fluoro, chloro, bromo and iodido.

In at least one embodiment of the present disclose, both X are joined together to form a $C_4$-$C_{20}$ diene ligand such as 1,3-butadiene, 1,3-pentadiene, 2-methyl-1,3-pentadiene, 2,4-dimethylpentadiene and the like.

In at least one embodiment of formula (II) of the present disclosure: 1) $R^3$ and/or $R^4$ are not aryl or substituted aryl, 2) $R^3$ is not directly bonded to a group 15 or 16 heteroatom, and 3) adjacent $R^4$, $R^c$, $R^a$ or $R^7$ do not join together to form a fused ring system, and 4) each $R^a$ is a $C_1$ to $C_{10}$ alkyl (preferably methyl, ethyl, propyl, butyl, pentyl, hexyl, heptyl, octyl, nonyl, decyl, or an isomer thereof).

In a preferred embodiment of the present disclosure, T of any of formulas (I)-(III) is represented by the formula $ER^g{}_2$ or $(ER^g{}_2)_2$, where E is C, Si, or Ge, and each $R^g$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^g$ can form a cyclic structure including aromatic, partially saturated, or saturated cyclic or fused ring system. Preferably, T is a bridging group comprising carbon or silica, such as dialkylsilyl, preferably T is selected from —$CH_2$—, —$CH_2CH_2$—, —$C(CH_3)_2$—, $Si(Me)_2$, cyclotrimethylenesilylene (—$Si(CH_2)_3$—), cyclopentamethylenesilylene (—$Si(CH_2)_5$—) and cyclotetramethylenesilylene (—$Si(CH_2)_4$—).

In at least one embodiment, a catalyst compound is one or more of:

dimethylsilylene(2,6,6-trimethyl-1,5,6,7-tetrahydro-s-indacen-1-yl) (t-butylamido)M(R)$_2$;

dimethylsilylene(6,6-dimethyl-1,5,6,7-tetrahydro-s-indacen-1-yl) (t-butylamido)M(R)$_2$;

dimethylsilylene(2,7,7-trimethyl-3,6,7,8-tetrahydro-as-indacen-3-yl) (t-butylamido)M(R)$_2$;

dimethylsilylene(7,7-dimethyl-3,6,7,8-tetrahydro-as-indacen-3-yl)(t-butylamido)M(R)$_2$;

dimethylsilylene(2,6,6-trimethyl-1,5,6,7-tetrahydro-s-indacen-1-yl)(cyclododecylamido)M(R)$_2$;

dimethylsilylene(6,6-dimethyl-1,5,6,7-tetrahydro-s-indacen-1-yl)(cyclododecylamido)M(R)$_2$;

dimethylsilylene(2,7,7-trimethyl-3,6,7,8-tetrahydro-as-indacen-3-yl)(cyclododecylamido)M(R)$_2$;

dimethylsilylene(7,7-dimethyl-3,6,7,8-tetrahydro-as-indacen-3-yl)(cyclododecylamido)M(R)$_2$;

dimethylsilylene(2,6,6-trimethyl-1,5,6,7-tetrahydro-s-indacen-1-yl)(cyclohexylamido)M(R)$_2$;

dimethylsilylene(6,6-dimethyl-1,5,6,7-tetrahydro-s-indacen-1-yl)(cyclohexylamido)M(R)$_2$;

dimethylsilylene(2,7,7-trimethyl-3,6,7,8-tetrahydro-as-indacen-3-yl)(cyclohexylamido)M(R)$_2$;

dimethylsilylene(7,7-dimethyl-3,6,7,8-tetrahydro-as-indacen-3-yl)(cyclohexylamido)M(R)$_2$;

dimethylsilylene(2,6,6-trimethyl-1,5,6,7-tetrahydro-s-indacen-1-yl)(adamantylamido)M(R)$_2$;

dimethylsilylene(6,6-dimethyl-1,5,6,7-tetrahydro-s-indacen-1-yl)(adamantylamido)M(R)$_2$;

dimethylsilylene(2,7,7-trimethyl-3,6,7,8-tetrahydro-as-indacen-3-yl)(adamantylamido)M(R)$_2$;

dimethylsilylene(7,7-dimethyl-3,6,7,8-tetrahydro-as-indacen-3-yl)(adamantylamido)M(R)$_2$;

dimethylsilylene(2,6,6-trimethyl-1,5,6,7-tetrahydro-s-indacen-1-yl)(neopentylamido)M(R)$_2$;

dimethylsilylene(6,6-dimethyl-1,5,6,7-tetrahydro-s-indacen-1-yl)(neopentylamido)M(R)$_2$;

dimethylsilylene(2,7,7-trimethyl-3,6,7,8-tetrahydro-as-indacen-3-yl)(neopentylamido)M(R)$_2$;

dimethylsilylene(7,7-dimethyl-3,6,7,8-tetrahydro-as-indacen-3-yl)(neopentylamido)M(R)$_2$;

dimethylsilylene(2-methyl-6,6-diethyl-1,5,6,7-tetrahydro-s-indacen-1-yl)(t-butylamido)M(R)$_2$;

dimethylsilylene(6,6-diethyl-1,5,6,7-tetrahydro-s-indacen-1-yl)(t-butylamido)M(R)$_2$;

dimethylsilylene(2-methyl-7,7-diethyl-3,6,7,8-tetrahydro-as-indacen-3-yl)(t-butylamido)M(R)$_2$;

dimethylsilylene(7,7-diethyl-3,6,7,8-tetrahydro-as-indacen-3-yl)(t-butylamido)M(R)$_2$;

dimethylsilylene(2-methyl-6,6-diethyl-1,5,6,7-tetrahydro-s-indacen-1-yl)(cyclododecylamido)M(R)$_2$;

dimethylsilylene(6,6-diethyl-1,5,6,7-tetrahydro-s-indacen-1-yl)(cyclododecylamido)M(R)$_2$;

dimethylsilylene(2-methyl-7,7-diethyl-3,6,7,8-tetrahydro-as-indacen-3-yl)(cyclododecylamido)M(R)$_2$;

dimethylsilylene(7,7-dimethyl-3,6,7,8-tetrahydro-as-indacen-3-yl)(cyclododecylamido)M(R)$_2$;

diethylsilylene(2,6,6-trimethyl-1,5,6,7-tetrahydro-s-indacen-1-yl)(t-butylamido)M(R)$_2$;

diethylsilylene(6,6-dimethyl-1,5,6,7-tetrahydro-s-indacen-1-yl)(t-butylamido)M(R)$_2$;

diethylsilylene(2,7,7-trimethyl-3,6,7,8-tetrahydro-as-indacen-3-yl)(t-butylamido)M(R)$_2$;

diethylsilylene(7,7-dimethyl-3,6,7,8-tetrahydro-as-indacen-3-yl) (t-butylamido)M(R)$_2$;

dimethylsilylene(2-methyl-3,6,7,8-tetrahydro-as-indacen-3-yl)(cyclohexylamido)M(R)$_2$;

dimethylsilylene(2-methyl-3,6,7,8-tetrahydro-as-indacen-3-yl)(cyclododecylamido)M(R)$_2$;

dimethylsilylene(2-methyl-3,6,7,8-tetrahydro-as-indacen-3-yl)(adamantylamido)M(R)$_2$; and dimethylsilylene(2-methyl-3,6,7,8-tetrahydro-as-indacen-3-yl)(t-butylamido)M(R)$_2$, where M is selected from Ti, Zr, and Hf and R is selected from halogen or C$_1$ to C$_5$ alkyl, preferably R is a methyl group or a halogen group, preferably M is Ti.

In alternative embodiments, a catalyst system can include two or more different transition metal compounds. For purposes of the present disclosure one transition metal compound is considered different from another if they differ by at least one atom. For example "Me$_2$Si(2,7,7-Me$_3$-3,6,7,8-tetrahydro-as-indacen-3-yl)(cyclohexylamido)TiCl$_2$" is different from Me$_2$Si(2,7,7-Me$_3$-3,6,7,8-tetrahydro-as-indacen-3-yl)(n-butylamido)TiCl$_2$" which is different from Me$_2$Si(2,7,7-Me$_3$-3,6,7,8-tetrahydro-as-indacen-3-yl)(n-butylamido)HfCl$_2$.

In some embodiments, formulae I through III are referred to as mono-tetrahydroindacenyl compounds, precatalysts and/or catalysts.

In at least one embodiment, one mono-tetrahydroindacenyl compound as described herein is used in the catalyst system.

Activators

The terms "cocatalyst" and "activator" are used herein interchangeably and include a compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include non-coordinating anion compounds, alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

Alumoxane Activators

Alumoxane activators are utilized as activators in the catalyst systems described herein. Alumoxanes are generally oligomeric compounds containing —Al(R$^1$)—O— sub-units, where R$^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

Non-Coordinating Anion Activators

Non-coordinating anion activators may also be used herein. The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with the present disclosure are those that are compatible, stabilize the transition metal cation in the sense of balancing its ionic charge at +1, and yet retain sufficient lability to permit displacement during polymerization.

It is within the scope of the present disclosure to use an ionizing activator, neutral or ionic, such as tri (n-butyl) ammonium tetrakis (pentafluorophenyl) borate, N,N-dimethylanilinium tetrakis(pentafluorophenyl)borate, N-dimethylanilinium tetrakis(perfluoronaphthyl)borate, a tris perfluorophenyl boron metalloid precursor or a tris perfluoronaphthyl boron metalloid precursor, polyhalogenated heteroborane anions (WIPO Publication No. WO 98/43983), boric acid (U.S. Pat. No. 5,942,459), alone or in combination with the alumoxane or modified alumoxane activators. It is also within the scope of the present disclosure to use neutral or ionic activators in combination with the alumoxane or modified alumoxane activators.

The catalyst systems of the present disclosure can include at least one non-coordinating anion (NCA) activator. Specifically the catalyst systems may include NCAs which either do not coordinate to a cation or which only weakly coordinate to a cation thereby remaining sufficiently labile to be displaced during polymerization.

In a preferred embodiment boron containing NCA activators represented by the formula below can be used:

$Z_d^+(A^{d-})$, where: Z is (L-H) or a reducible Lewis acid; L is a neutral Lewis base; H is hydrogen; and (L-H) is a Bronsted acid; A$^{d-}$ is a boron containing non-coordinating anion having the charge d−; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums and mixtures, preferably carboniums and ferroceniums. Most preferably, $Z_d^+$ is triphenyl carbonium. Preferred reducible Lewis acids can be any triaryl carbonium (where the aryl can be substituted or unsubstituted, such as those represented by the formula: (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl), preferably the reducible Lewis acids as "Z" include those represented by the formula: (Ph$_3$C), where Ph is a substituted or unsubstituted phenyl, preferably substituted with C$_1$ to C$_{40}$ hydrocarbyls or substituted a C$_1$ to C$_{40}$ hydrocarbyls, preferably C$_1$ to C$_{20}$ alkyls or aromatics or substituted C$_1$ to C$_{20}$ alkyls or aromatics, preferably Z is a triphenylcarbonium.

When $Z_d^+$ is the activating cation (L-H)$_d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ wherein k is 1, 2, or 3; n is 1, 2, 3, 4, 5, or 6 (preferably 1, 2, 3, or 4); n−k=d; M is an element selected from group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably, each Q is a fluorinated aryl group, and most preferably, each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activating cocatalyst are the compounds described as (and particularly those specifically listed as) activators in U.S. Pat. No. 8,658,556, which is incorporated by reference herein.

Most preferably, the ionic activator $Z_d^+$ ($A^{d-}$) is one or more of N,N-dimethylanilinium tetrakis(pentafluorophenyl) borate, N,N-dimethylanilinium tetrakis(perfluoronaphthyl) borate, N,N-dimethylanilinium tetrakis(perfluorobiphenyl) borate, N,N-dimethylanilinium tetrakis(3,5-bis (trifluoromethyl)phenyl)borate, triphenylcarbenium tetrakis (perfluoronaphthyl)borate, triphenylcarbenium tetrakis (perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

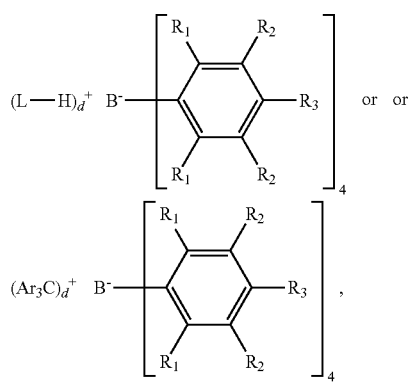

where: each $R_1$ is, independently, a halide, preferably a fluoride; Ar is substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics; each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group); each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring); and L is an neutral Lewis base; (L-H)$^+$ is a Bronsted acid; d is 1, 2, or 3; wherein the anion has a molecular weight of greater than 1020 g/mol; wherein at least three of the substituents on the B atom each have a molecular volume of greater than 250 cubic Å, alternately greater than 300 cubic Å, or alternately greater than 500 cubic Å.

Preferably, $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3$V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
|---|---|
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

For a list of particularly useful bulky activators please see U.S. Pat. No. 8,658,556, which is incorporated by reference herein.

In another embodiment, one or more of the NCA activators is chosen from the activators described in U.S. Pat. No. 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, Me$_3$NH$^+$] [B(C$_6$F$_5$)$_4$]$^-$]; 1-(4-(tris(pentafluorophenyl)borate)-2,3,5,6-tetrafluorophenyl)pyrrolidinium; and tetrakis(pentafluorophenyl)borate, and 4-(tris(pentafluorophenyl)borate)-2,3,5,6-tetrafluoropyridine.

In at least one embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

In preferred embodiments of the invention, N,N-dimethylanilinium tetrakis(perfluoronaphthyl)borate is the preferred activator.

The typical NCA activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

Activators useful herein also include those described in U.S. Pat. No. 7,247,687 at column 169, line 50 to column 174, line 43, particularly column 172, line 24 to column 173, line 53.

It is also within the scope of the present disclosure that the catalyst compounds can be combined with combinations of alumoxanes and NCA's (see for example, U.S. Pat. Nos. 5,153,157, 5,453,410, European Patent No. 0 573 120 B1, WIPO Publication Nos. WO 94/07928, and WO 95/14044) which discuss the use of an alumoxane in combination with an ionizing activator).

Optional Scavengers or Co-Activators

In addition to the activator compounds, scavengers, chain transfer agents or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Useful chain transfer agents that may also be used herein are typically a compound represented by the formula AlR$_3$, ZnR$_2$ (where each R is, independently, a C$_1$-C$_8$ aliphatic radical, preferably methyl, ethyl, propyl, butyl, pentyl, hexyl octyl or an isomer thereof) or a combination thereof, such as diethyl zinc, trimethylaluminum, triisobutylaluminum, trioctylaluminum, or a combination thereof.

Supports

In some embodiments, the catalyst compounds described herein may be supported (with or without an activator) by any method effective to support other coordination catalyst systems, effective meaning that the catalyst so prepared can be used for oligomerizing or polymerizing olefin in a heterogeneous process. The catalyst precursor, activator, co-activator if needed, suitable solvent, and support may be added in any order or simultaneously. Typically, the complex and activator may be combined in solvent to form a solution. Then the support is added, and the mixture is stirred for 1 minute to 10 hours. The total solution volume may be greater than the pore volume of the support, but some embodiments limit the total solution volume below that needed to form a gel or slurry (about 90% to 400%, preferably about 100-200% of the pore volume). After stirring, the residual solvent is removed under vacuum, typically at ambient temperature and over 10-16 hours, but greater or lesser times and temperatures are possible.

The complex may also be supported absent the activator; in that case, the activator (and co-activator if needed) is added to a polymerization process's liquid phase. Additionally, two or more different complexes may be supported on the same support. Likewise, two or more activators or an activator and co-activator may be supported on the same support.

Suitable solid particle supports are typically comprised of polymeric or refractory oxide materials, each being preferably porous. A support material can have an average particle size greater than 10 μm for use in embodiments of the present disclosure. VA support material can be a porous support material, such as, talc, inorganic oxides, inorganic chlorides, for example, magnesium chloride and resinous support materials such as polystyrene polyolefin or polymeric compounds or any other organic support material and the like. A support material can be an inorganic oxide material including group-2, -3, -4, -5, -13, or -14 metal or metalloid oxides. A catalyst support materials can be silica, alumina, silica-alumina, and their mixtures. Other inorganic oxides may serve either alone or in combination with the silica, alumina, or silica-alumina. These are magnesia, titania, zirconia, and the like. Lewis acidic materials such as montmorillonite and similar clays may also serve as a support. In this case, the support can optionally double as the activator component; however, an additional activator may also be used.

The support material may be pretreated by any number of methods. For example, inorganic oxides may be calcined, chemically treated with dehydroxylating agents such as aluminum alkyls and the like, or both.

As stated above, polymeric carriers will also be suitable in accordance with the present disclosure, see for example the descriptions in WIPO Publication No. WO 95/15815 and U.S. Pat. No. 5,427,991. The methods disclosed may be used with the catalyst complexes, activators or catalyst systems of the present disclosure to adsorb or absorb them on the polymeric supports, particularly if made up of porous particles, or may be chemically bound through functional groups bound to or in the polymer chains.

Useful supports typically have a surface area of from 10-700 m$^2$/g, a pore volume of 0.1-4.0 cc/g and an average particle size of 10-500 μm. Some embodiments select a surface area of 50-500 m$^2$/g, a pore volume of 0.5-3.5 cc/g, or an average particle size of 20-200 μm. Other embodiments select a surface area of 100-400 m$^2$/g, a pore volume of 0.8-3.0 cc/g, and an average particle size of 30-100 μm. Useful supports typically have a pore size of 10-1000 Angstroms, alternatively 50-500 Angstroms, or 75-350 Angstroms.

The catalyst complexes described herein are generally deposited on the support at a loading level of 10-100 micromoles of complex per gram of solid support; alternately 20-80 micromoles of complex per gram of solid support; or 40-60 micromoles of complex per gram of support. Greater or lesser values may be used provided that the total amount of solid complex does not exceed the support's pore volume.

In an alternative embodiment, catalyst complexes and catalyst systems described herein may be present on a fluorided support, e.g. a support, desirably particulate and porous, which has been treated with at least one inorganic fluorine containing compound. For example, the fluorided support composition can be a silicon dioxide support wherein a portion of the silica hydroxyl groups has been replaced with fluorine or fluorine containing compounds. For example, a useful support herein, is a silica support treated with ammonium hexafluorosilicate and/or ammonium tetrafluoroborate fluorine compounds. Typically, the fluorine concentration present on the support is in the range of from 0.1 to 25 wt %, alternately 0.19 to 19 wt %, alternately from 0.6 to 3.5 wt %, based upon the weight of the support.

In an embodiment of the present disclosure, the catalyst system comprises fluorided silica, alkylalumoxane activator, and the bridged monocyclopentadienyl group 4 transition metal compound, where the fluorided support has not been calcined at a temperature of 400° C. or more.

The catalyst compound may be present on a support at 1 to 100 µmol/g supported catalyst, preferably 20-60 µmol/g supported catalyst.

The present disclosure also relates to metallocene catalyst systems comprising the reaction product of at least three components: (1) one or more bridged metallocenes having one tetrahydroindacenyl group; (2) one or more alkylalumoxane or NCA activator; and (3) one or more fluorided support compositions, where the fluorided support composition has not been calcined at 400° C. or more, preferably the fluorided support composition has been calcined at a temperature of 100° C. to 395° C., alternately 125° C. to 350° C., alternately 150° C. to 300° C.).

Typically, the fluorided supports described herein are prepared by combining a solution of polar solvent (such as water) and fluorinating agent (such as $SiF_4$ or $(NH_4)_2SiF_6$) with a slurry of support (such as a toluene slurry of silica), then drying until it is free flowing, and optionally, calcining (typically at temperatures over 100° C. for at least 1 hour). The supports are then combined with activator(s) and catalyst compound (separately or together).

For more information on fluorided supports and methods to prepare them, please see U.S. Ser. No. 62/149,799, filed Apr. 20, 2015 (and all cases claiming priority to or the benefit of U.S. Ser. No. 62/149,799); U.S. Ser. No. 62/103,372, filed Jan. 14, 2015 (and all cases claiming priority to or the benefit of U.S. Ser. No. 62/103,372); and PCT/US2015/067582, filed Dec. 28, 2015, which are incorporated by reference herein.

Second Polymers

Compositions of the present disclosure comprise a second polymer different than the PEDM terpolymer described above. The second polymer is preferably an ethylene-based copolymer. In at least one embodiment, a composition comprises a blend of the PEDM terpolymer and one or more ethylene-based copolymer(s).

Compositions of the present disclosure may comprise one or more second polymers (ethylene-based copolymers) in an amount from about 60 phr to about 95 phr, such as from about 65 phr to about 95 phr, such as from about 70 phr to about 95 phr, such as from about 70 phr to about 90 phr, such as from about 75 phr to about 90 phr, such as from about 80 phr to about 85 phr, where the basis of 100 parts rubber is taken as the combined weight of first polymer (e.g., PEDM) and second polymer (e.g., ethylene-based copolymer) in the composition.

Ethylene-based copolymers of the present disclosure comprise an ethylene content different than the ethylene content of the PEDM terpolymer. In at least one embodiment, an ethylene-based copolymer has at least 40 wt % ethylene content, preferably at least 50, 55, 60, 65, 70 or 75 wt % ethylene content, and at most 99 wt % ethylene content, such as at most 95, 90, 85, 80, 75, or 70 wt % in various embodiments (again based on the weight of the ethylene-based copolymer). By contrast, as discussed above, the PEDM terpolymers of the present disclosure have an ethylene content of between 5 and 20%. Ethylene-based copolymers of the present disclosure further comprise a $C_3$ to $C_{12}$ α-olefin content and, optionally, a polyene (preferably diene) content comprising one or more polyenes (preferably one or more dienes). $C_3$ to $C_{12}$ α-olefins include propylene, butylene, pentylene, hexylene, heptylene, octylene, nonylene, decylene, undecylene, dodecylene, and branched isomers thereof. Propylene is particularly preferred according to some embodiments (e.g., such that the ethylene-based copolymer may be an EP(D)M copolymer), while butylene (1-butene) is preferred in yet other embodiments (e.g., such that the ethylene-based copolymer may be an EB(D)M copolymer).

With respect to the polyenes, any polyene suitable in the PEDM is suitable for inclusion in the ethylene-based copolymer, with VNB or ENB, and in particular ENB, preferred. According to yet other embodiments, suitable polyenes may include conjugated dienes. Conjugated dienes include 1,3-butadiene, 2-methyl-1,3-butadiene, 2,3-di($C_1$ to $C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. Dienes also include vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene. Ethylene-based copolymers of various embodiments preferably have 0 to 20 wt % polyene content, such as 0 to 15 wt %, preferably 1 to 10 wt %, 2 to 9 wt %, or 3 to 7 wt %, with ranges from any of the foregoing low ends to any of the foregoing high ends also contemplated in various embodiments.

Further, in certain embodiments, ethylene-based copolymers of the present disclosure can have isotactic polypropylene content.

According to some embodiments, the ethylene-based copolymer exhibits more crystallinity than the PEDM; for instance, it may have Hf>1 J/g. According to yet further embodiments, crystallinity of ethylene-based copolymers of the present disclosure may be expressed in terms of percentage of crystallinity (i.e., % crystallinity), as determined according to the DSC procedure described herein. An ethylene-based copolymer may have a % crystallinity of from 5% to 80%, such as from 10% to 60%, such as from 20% to 40%. (The degree of crystallinity is determined by dividing heat of fusion measured with the heat of fusion for 100% crystalline polyethylene which has the value of 293 J/g (B. Wunderlich, Thermal Analysis, Academic Press, 1990, pp. 417-431).)

An ethylene-based copolymer may be an ethylene-propylene copolymer and in particular an EP(D)M terpolymer (such as VISTALON™ 706, TAFMER™, or VERSIFY™) or an EB(D)M terpolymer. Ethylene-based copolymers of the present disclosure can have a weight average molecular weight (Mw) from 10,000 g/mol to 400,000 g/mol, such as 100,000 g/mol to 200,000. They may also or instead have a melting point (DSC) of less than 110° C., such as less than 100° C.

Compositions described herein can comprise a single ethylene-based copolymer or a mixture of several ethylene-based copolymers, it being possible for the ethylene-based copolymers to be used in combination with any type of synthetic elastomer other than an ethylene-based copolymer, indeed even with polymers other than elastomers, for example thermoplastic polymers.

In at least one embodiment, the second polymer (ethylene-based copolymer) is a polyethylene-polybutadiene block-copolymer, wherein the polyethylene-polybutadiene block-copolymer is a block copolymer having the general formula: PE-XL-fPB; where "PE" is a polyethylene block having a weight average molecular weight within the range from 1,000 to 150,000 g/mol, the "fPB" is a functionalized polar polybutadiene block having a weight average molecular weight from 500 g/mol to 30,000 g/mol, and "XL" is a crosslinking moiety that covalently links the PE and fPB blocks; and wherein the Maximum Energy Loss (Tangent Delta) of the immiscible polyolefin domain is a temperature within the range from −30° C. to 10° C.

In at least one embodiment, compositions of the present disclosure comprise 15 wt % to 60 wt % of a styrenic copolymer; 1 wt % to 60 wt % of a polybutadiene polymer; 1 wt % to 60 wt % of natural rubber or synthetic polyisoprene; 15 wt % to 60 wt % of a functionalized styrenic copolymer; 1 wt % to 60 wt % of a functionalized polar polybutadiene polymer; or 1 wt % to 60 wt % of natural rubber or functionalized synthetic polyisoprene.

Polymer Blending

Compositions of the present disclosure may be formed by combining the first polymer (PEDM) and the second polymer (ethylene-based copolymer) using any suitable method known in the polymer processing art. For example, a composition may be made by blending the first polymer and second polymer in solution and generally removing the blend. This polymer composition has predetermined amounts of the first polymer and second polymer and may be made by independent polymerization of the first and second elastomeric polymeric components. Such individual polymerization may be conducted in series or parallel polymerization reactors or in a single polymerization reactor with at least two different polymerization catalysts. Procedures for the recovery of such a predetermined composition are described in U.S. Pat. No. 4,722,971, which are incorporated herein by reference. The disclosure includes traditional Ziegler-Natta catalyst systems; however, metallocene catalyst systems are also contemplated for the present disclosure.

In at least one embodiment, a method for preparing a composition of the first polymer (PEDM) and the second polymer (ethylene-based copolymer) includes contacting in a first reactor a first metallocene catalyst with ethylene, propylene, and a diene to form a first polymer. The first polymer comprises from 0.5 wt % to 5 wt % diene content, such as from 1 wt % to 2 wt %, based on the total weight of the polymer; and from 5 wt % to 20 wt % ethylene content, such as 5 wt % to 15 wt %, (e.g., 5 to 10 wt %, or 10 to 15 wt %), based on the total weight of the polymer; and from 50 wt % to 91 wt %, such as 55 to 85 wt %, atactic propylene content. The method further includes contacting in a second reactor (or the first reactor) a second metallocene catalyst with ethylene and propylene, and optionally a diene, to form a second polymer such as an EP copolymer or EP(D)M terpolymer. Methods can include transferring the first polymer to the second reactor or the second polymer to the first reactor and recovering from the second reactor or the first reactor, respectively, a composition comprising from 5 phr to 40 phr, such as about 5 phr to 30 phr, such as about 10 phr to about 20 phr, of the first polymer and from 60 phr to 95 phr of the second polymer. The recovered polymer composition may then be crosslinked, for example, as described in more detail below.

Alternatively, in at least one embodiment, a blend of first polymer and second polymer may be prepared by combining the first polymer from the first reactor and the second polymer from the second reactor and mixed, for example, in a production extruder, such as the extruder on an injection molding machine or on a continuous extrusion line.

In at least one embodiment, the method of blending the polymers may be to melt-blend the polymers in a batch mixer, such as a BANBURY™ or BARBENDER™ mixer. Blending may include melt blending the first polymer and the second polymer in an extruder, such as a single-screw extruder or a twin-screw extruder. Extrusion technology for polymer blends is well known in the art, and is described in more detail in, for example, PLASTICS EXTRUSION TECHNOLOGY, F. Hensen, Ed. (Hanser, 1988), pp. 26-37, and in POLYPROPYLENE HANDBOOK, E. P. Moore, Jr. Ed. (Hanser, 1996), pp. 304-348.

The first polymer and the second polymer may also be blended by a combination of methods including, but not limited to, solution blending, melt mixing, compounding in a shear mixer and combinations thereof. For example, dry blending followed by melt blending in an extruder, or batch mixing of some components followed by melt blending with other components in an extruder. The first polymer and the second polymer may also be blended using a double-cone blender, ribbon blender, or other suitable blender, or in a Farrel Continuous Mixer (FCM™).

The first polymer, the second polymer, and additives (e.g., curatives, crosslinking agents, fillers, process oils, plasticizers, compatibilizers, crosslinkers, and the like) may be blended in varying orders, which in some instances may alter the properties of the resultant composition.

In some instances, a master batch that comprises the first polymer, the second polymer, and additives (except curatives and crosslinking agents) may be produced at a first temperature. Then, the curatives and/or crosslinking agents may be mixed into the master batch at a second temperature that is lower than the first temperature.

In some embodiments, the master batch may be produced by mixing together in one step the first polymer, the second polymer, and the additives (except curatives and crosslinking agents) until the additives are incorporated (e.g., producing a homogeneous blend). This is referred to herein as a first pass method or first pass blending. After the first pass blending produces the master batch, the curatives and/or crosslinking agents may be mixed into the master batch to produce the final blend.

In alternative embodiments, a two step mixing process may be used to produce the master batch. For example, in some embodiments, the master batch may be produced by mixing the second polymer (ethylene-based copolymer) with the additives (except curatives and crosslinking agents) until the additives are incorporated into the second polymer (e.g., producing a homogeneous blend). Then, the resultant blend is mixed with the first polymer (PEDM) and the curatives and/or crosslinking agents. This is referred to herein as a second pass method or a second pass blending. Alternatively, the curatives and/or crosslinking agents may be mixed into the master batch after addition of the PEDM in the second pass to produce the final blend.

In some second pass blending embodiments, mixing the second polymer/additive (except curatives and crosslinking agents) blend with the first polymer may be done in mixer or other suitable system without removing the second polymer/additive blend from the mixer (i.e., first pass blending) to produce the master batch. In alternative embodiments, the second polymer/additive (except curatives and crosslinking agents) blend may be removed from a mixer or other suitable system for producing the blend, and, then, mixed with the first polymer in a mixer or other suitable system (i.e., second pass blending) to produce the master batch.

The homogeneous mixture may be achieved by mixing for a certain time that corresponds to producing a homogeneous mixture. In some instances, a mixing parameter of the second polymer and the chosen additives may change when a homogeneous mixture is achieved. For example, when mixing carbon black (an exemplary filler) with the second polymer, the torque may reach a maximum, steady-state where no to minimal appreciable increases in torque are observed.

Compositions

Compositions of the present disclosure include and/or are the reaction product of the first polymer and the second polymer (as a polymer blend or otherwise) described above (and in whatever form: pellet, bale, or otherwise). As described above, compositions of the present disclosure may further include and/or be the reaction product of any one or more additives (e.g., curatives, crosslinking agents, fillers, process oils, plasticizers, compatibilizers, crosslinkers, and the like).

In embodiments where curatives, e.g., crosslinking agents or vulcanizing agents, are present in a composition, the polymers of the composition may be present in at least partially crosslinked form (that is, at least a portion of the polymer chains are crosslinked with each other, e.g., as a result of a curing process typical for EP(D)M rubbers). Accordingly, particular embodiments provide for an at least partially crosslinked elastomeric composition made by mixing (in accordance with any of the above-described methods for polymer blends) a composition comprising: (a) a first polymer (PEDM) and a second polymer (ethylene-based copolymer); (b) one or more vulcanization activators; (c) one or more vulcanizing agents; and/or (d) one or more further additives.

Suitable vulcanization activators include zinc oxide, stearic acid, and the like. These activators may be mixed in amounts ranging from 0.1 phr to 20 phr. Different vulcanization activators may be present in different amounts. For instance, where the vulcanization activator includes zinc oxide, the zinc oxide may be present in an amount from 1 phr to 20 phr, such as from 2.5 phr to 10 phr (e.g., about 5 phr), while stearic acid may preferably be employed in amounts ranging from 0.1 phr to 5 phr, such as 0.1 phr to 2 phr (e.g., about 1.5 phr).

Any suitable vulcanizing agent known in the art may be used. Of particular note are curing agents as described in Col. 19, line 35 to Col. 20, line 30 of U.S. Pat. No. 7,915,354, which description is hereby incorporated by reference (e.g., sulfur, peroxide-based curing agents (VUL-CUP™ 40 KE available from Arkema of Colombes, France, resin curing agents, silanes, and hydrosilane curing agents). Other examples include phenolic resin curing agents (e.g., as described in U.S. Pat. No. 5,750,625, also incorporated by reference herein). Cure co-agents may also be included (e.g., zinc dimethacrylate (ZDMA) (DYMALINK™ 708, available from Cray Valley) or those described in the already-incorporated description of U.S. Pat. No. 7,915,354).

Further additives may be chosen from any known additives useful for EPDM compositions, and include, among others, one or more of:

Process oil, such as paraffinic and/or isoparaffinic process oil (examples including SUNPAR™ 2280 (available from HollyFrontier Refining & Marketing LLC, Tulsa, Okla.); as well as FLEXON™ 876, CORE™ 600 base stock oil, FLEXON™ 815, and CORE™ 2500 base stock oil, available from ExxonMobil Chemical Company, Baytown, Tex. Particularly in embodiments where color of the end product may be important, a white oil (e.g., API Group II or Group III base oil) may be used as process oil. Examples include paraffinic and/or isoparaffinic oils with low (under 1 wt %, preferably under 0.1 wt %) aromatic and heteroatom content. Compositions of the present disclosure may comprise process oil from 1 phr to 150 phr, such as 50 phr to 100 phr, such as 60 phr to 80 phr, or, for sponge grades, from 50 phr to 200 phr, such as 70 phr to 150 phr, such as 80 phr to 100 phr, and preferred process oils have viscosity at 40° C. from 80 CSt to 600 CSt;

Vulcanization accelerators: compositions of the present disclosure can comprise 0.1 phr to 15 phr, such as 1 phr to 5 phr, or 2 phr to 4 phr, with examples including thiazoles such as 2-mercaptobenzothiazole or mercaptobenzothiazyl disulfide (MBTS); guanidines such as diphenylguanidine; sulfenamides such as N-cyclohexylbenzothiazolsulfenamide; dithiocarbamates such as zinc dimethyl dithiocarbamate, zinc diethyl dithiocarbamate, zinc dibenzyl dithiocarbamate (ZBEC); and zinc dibutyldithiocarbamate, thioureas such as 1,3-diethylthiourea, thiophosphates and others;

Processing aids (e.g., polyethylene glycol or zinc soap);

Carbon black (e.g., having particle size from 20 nm to 600 nm and structure having DBPA (dibutyl phthalate absorption number) within the range from 0 to 150, as measured by the DBP method. Compositions of the present disclosure may comprise carbon black from 1 phr to 500 phr, preferably from 1 phr to 200 phr, such as from 50 phr to 150 phr;

Mineral fillers (talc, calcium carbonate, clay, silica, aluminum trihydrate, and the like), which may be present in the composition from 1 phr to 200 phr, preferably from 20 phr to 100 phr, such as from 30 phr to 60 phr;

Where foaming may be desired, sponge or foaming grade additives, such as foaming agent or blowing agent, particularly in very high Mooney viscosity embodiments, such as those suitable for sponge grades. Examples of such agents include: azodicarbonamide (ADC), ortho-benzo sulfonyl hydrazide (OBSH), p-toluenesulfonylhydrazide (TSH), 5-phenyltetrazole (5-PT), and sodium bicarbonate in citric acid. Microcapsules may also, or instead, be used for such foaming applications. These may include a thermo-expandable microsphere comprising a polymer shell with a propellant contained therein. Examples are known in the art and described in, for example, U.S. Pat. Nos. 6,582,633 and 3,615,972, WIPO Publication Nos. WO 99/46320 and WO 99/43758, and contents of which hereby are incorporated by reference. Examples of such thermo-expandable microspheres include EXPANCEL™ products commercially available from Akzo Nobel N.V., and ADVANCELL™ products available from Sekisui. In other embodiments, sponging or foaming may be accomplished by direct injection of gas and/or liquid (e.g., water, $CO_2$, $N_2$) into the rubber in an extruder, for foaming after passing the composition through a die; and Various other additives may also be included, such as antioxidants (e.g., 1,2-dijydro-2,2,4-trimethylquinoline), stabilizers, anticorrosion agents, UV absorbers, antistatics, slip agents, moisture absorbents (e.g., calcium oxide), pigments, dyes or other colorants.

The at least partially crosslinked polymer compositions of the present disclosure are formed by mixing the above-described components in any suitable manner described in the Polymer Blending section above, e.g. Banbury mixer. Mixing in these embodiments may include any one or more of typical mixing processes for EP(D)M compositions, such as open mill mixing, mixing using internal mixers or kneaders, and extrusion (e.g., through a twin-screw extruder).

Further, in some embodiments, additives may be incorporated into a polymer blend directly or as part of a master batch, i.e., an additive package containing several additives to be added at one time in predetermined proportions. The master batch may be added in any suitable amount. For example, a master batch comprising an additive may be used in an amount ranging from about 0.1 to about 10 wt %, or from about 0.25 to about 7.5 wt %, or from about 0.5 to about 5 wt %, or from about 1 to about 5 wt %, or from about 2 to about 4 wt %, based on the total weight of the polymer blend and the master batch. This is a common practice in polymer processing, typically used for addition of color, additives, and fillers to final compositions. Dispersion (or "letdown") of the master batch may take place as part of a processing step used to fabricate articles, such as in the extruder on an injection molding machine or on a continuous extrusion line, or during a separate compounding step.

Belts

Compositions of the present disclosure may be used as one or more components of a transmission belt (e.g., V-belt, a flat belt, a toothed or synchronous belt, or multi-ribbed belt) and/or a conveyor belt.

FIG. 1 is a fragmented perspective view of a transmission belt in accordance with some embodiments of the present disclosure. As shown in FIG. 1, synchronous belt 100 includes elastomeric main body portion 102 and sheave contact portion 104 positioned along the inner periphery of main body portion 102. Main body portion 102 comprises one or more PEDM-including compositions of the present disclosure. Sheave contact portion 104 is configured to form alternating transverse projections 106 and troughs 108 configured to couple with a transverse-grooved pulley or sprocket. Tensile layer 110 is positioned within main body portion 102 for providing support and strength to belt 100. Tensile layer 110 includes a plurality of tensile cords 112 disposed longitudinally along the length of main body portion 112. Cords 112 comprise any suitable material, such as one or more of cotton, rayon, polyamide, polyester, aramid, steel, glass, carbon, polyketone, basalt, boron, or discontinuous fibers oriented for low load carrying capability. Reinforcing fabric 114 is disposed on projections 106 troughs 108 to form a sheave contact portion. Reinforcing fabric 114 may be of any suitable configuration such as a conventional weave consisting of warp and weft threads at an angle, or may include warp threads held together by space pick cords, or a knitted or braided configuration, or a nonwoven fabric. Suitable fabrics include one or more of cotton, polyester, polyamide, acrylic, aramid, polyketone, hemp, jute, or fiberglass.

Figure 2:
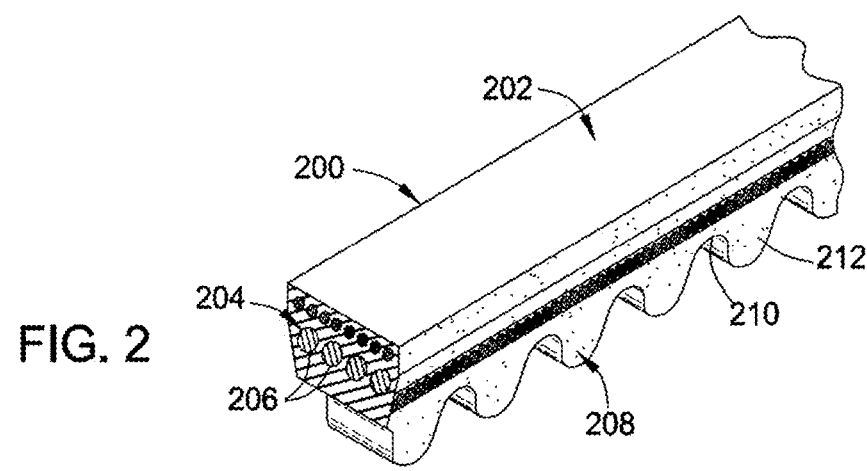
FIG. 2 is a fragmented perspective view of a transmission belt in accordance with further embodiments of the present disclosure.

FIG. 2 is a fragmented perspective view of a transmission belt according to further embodiments of the present disclosure. As shown in FIG. 2, notched V-belt 200 includes elastomeric body portion 202 and tensile layer 204 comprising cords 206. Main body portion 202 comprises one or more compositions (PEDM-containing compositions) of the present disclosure. Cords 206 comprise any suitable material, such as one or more of cotton, rayon, polyamide, polyester, aramid, steel, glass, carbon, polyketone, basalt, boron, or discontinuous fibers oriented for low load carrying capability. V-belt 200 includes sheave contact portion 208 having two juxtaposed sides of the belt, designed to wedge into a V-sheave. V-belt 200 includes troughs 210 and projections 212. Included in the category of V-belts are those V-belts designed for continuously variable transmission ("CVT") applications, which often exhibit a belt body relatively wider than the belt thickness.

Figure 3:
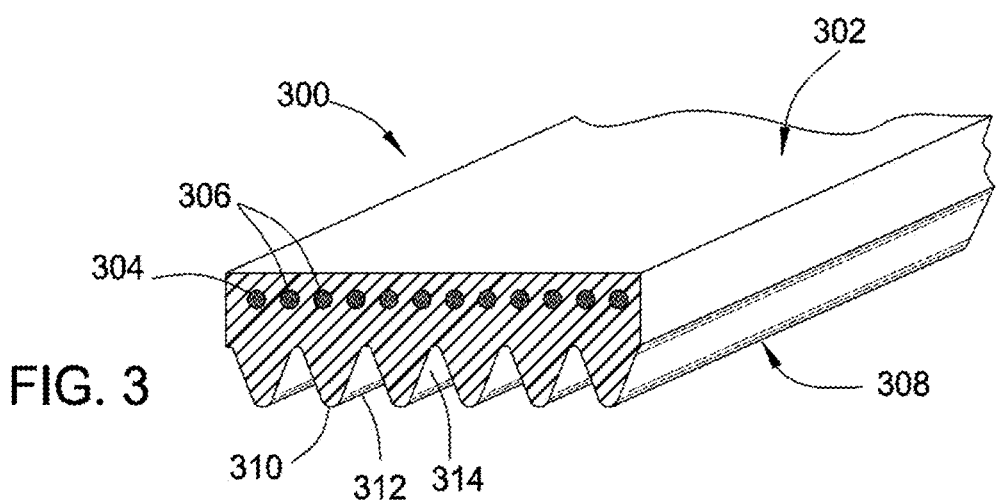
FIG. 3 is a fragmented perspective view of a transmission belt in accordance with yet further embodiments of the present disclosure.

FIG. 3 is a fragmented perspective view of a transmission belt according to one embodiment of the present disclosure. As shown in FIG. 3, multi-V-ribbed belt 300 includes main body portion 302 and also tensile reinforcement member 304 comprising cords 306. Main body portion 302 comprises one or more compositions (PEDM-containing compositions) of the present disclosure. Longitudinally grooved sheave contact portion 308 comprises a plurality of projections 310 alternating with a plurality of troughs 312, which together define driving surfaces 314 of the belt 300. In each of these instances of FIG. 1, FIG. 2, and FIG. 3, the respective sheave contact portion is coupleable/coupled with the respective main body portion and may be formed from the same material or layered with different material.

In each of the three exemplary belt embodiments shown in FIG. 1, FIG. 2, and FIG. 3, compositions (PEDM-containing compositions) of the present disclosure that form the main belt body portion, may further comprise any suitable polymer. Suitable additional polymers include polyurethane elastomers (including as well polyurethane/urea elastomers and so-called millable gums) (PU), polychloroprene rubber (CR), acrylonitrile butadiene rubber (NBR), hydrogenated NBR (HNBR), styrene-butadiene rubber (SBR), alkylated chlorosulfonated polyethylene (ACSM), polyepichlorohydrin, polybutadiene rubber (BR), natural rubber (NR), and ethylene alpha olefin elastomers such as ethylene propylene copolymers (EPM), ethylene propylene diene terpolymers (EPDM), ethylene octene copolymers (EOM), ethylene butene copolymers (EBM), ethylene octene terpolymers (EODM); ethylene butene terpolymers (EBDM); ethylene vinylacetate elastomers (EVM); ethylene methylacrylate (EAM); and silicone rubber.

To form the elastomeric belt body portion of a transmission belt in accordance with at least one embodiment of the present disclosure, the polymers may be blended according to known mixing methods and, as described above, with conventional rubber compounding ingredients including but not limited to fillers, plasticizers, stabilizers, vulcanization agents/curatives, coagents, and accelerators, in amounts conventionally employed.

Other Mechanical Goods

Compositions of the present disclosure may be used as one or more components of industrial and garden hoses, both molded and extruded sponge parts, and gaskets and seals. In such components, the compositions of the present disclosure (comprising the first polymer, the second polymer, and optionally one or more additives) may be adhered to another polymer composition including cotton, rayon, polyamide, polyester, aramid, steel, glass, carbon, polyketone, basalt, and boron, each of which may be in a form that includes a film, a belt, a hose, a tire, a woven fabric, or a nonwoven fabric. Because of the enhanced adhesion properties of the compositions of the present disclosure, the adherence to the foregoing materials may be significantly better than adherence between EP(D)M and the material. For example, adhesion between a film having a composition of the present disclosure and a film (substrate) of polyester or polyamide may have a rubber to substrate tack exceeding 20 gm force/inch width. Additionally, polyester or polyamide fibers may adhere more strongly to the compositions of the present disclosure than an EP(D)M alone.

EXAMPLES

Molecular weights (number average molecular weight (Mn), weight average molecular weight (Mw), and z-average molecular weight (Mz)) were determined using a Polymer Laboratories Model 220 high temperature GPC-SEC equipped with on-line differential refractive index (DRI), light scattering (LS), and viscometer (VIS) detectors. It used three Polymer Laboratories PLgel 10 m Mixed-B columns for separation using a flow rate of 0.54 ml/min and a nominal injection volume of 300 μL. The detectors and columns were contained in an oven maintained at 135° C. The stream emerging from the SEC columns was directed into the miniDAWN (Wyatt Technology, Inc.) optical flow cell and then into the DRI detector. The DRI detector was an integral part of the Polymer Laboratories SEC. The viscometer was inside the SEC oven, positioned after the DRI detector. The details of these detectors as well as their calibrations have been described by, for example, T. Sun, P. Brant, R. R. Chance, and W. W. Graessley, in 34(19) *Macromolecules*, 6812-6820, (2001).

Mooney viscosity (ML) can be determined by ASTM D1646-17 ((1+4), 125° C., 2 s$^{-1}$ shear rate). Melt Flow Rate (MFR) is measured according to ASTM D1238 test method, at 230° C. and 2.16 kg load, and is expressed as dg/min or g/10 min. Ethylene content is determined using FTIR according the ASTM D3900 and is not corrected for diene content. ENB is determined using FTIR according to ASTM D6047.

Polymer Formation:

Second polymers (ethylene-based copolymers) were purchased from commercial sources.

Polymerizations of first polymers (PEDM A, PEDM B, and PEDM C) were carried out using a solution process in a 28 liter continuous stirred-tank reactor (autoclave reactor). The autoclave reactor was equipped with an agitator, a pressure controller, and insulation to prevent heat loss. The reactor temperature was controlled by controlling the catalyst feed rates and heat removal was provided by feed chilling. All solvents and monomers were purified over beds of alumina and molecular sieves. The reactor was operated liquid full and at a pressure of 1600 psi. Isohexane was used as a solvent. It was fed into the reactor using a turbine pump and its flow rate was controlled by a mass flow controller downstream. The compressed, liquefied propylene feed was controlled by a mass flow controller. ENB feed was controlled by a mass flow controller. Hydrogen was fed to the reactor by a thermal mass flow controller. Ethylene feed was also controlled by a mass flow controller. The ethylene, propylene, hydrogen and ENB were mixed into the isohexane at separate addition points via a manifold. A 3 wt. % mixture of tri-n-octylaluminum in isohexane was also added to the manifold through a separate line (used as a scavenger) and the combined mixture of monomers, scavenger, and solvent was fed into the reactor through a single tube.

An activated catalyst (dimethylsilylene (2,6,6-trimethyl-1,5,6,7-tetrahydro-s-indacen-1-yl)(tert-butylamido)titanium dimethyl) solution was prepared in a 4 L Erlenmeyer flask in a nitrogen-filled glove box. The flask was charged with 4 L of air-free anhydrous toluene and appropriate amount of the catalyst and the activator (N,N-dimethylanilinium tetrakis(perfluoronaphthyl)borate) to make the solution. After the solids dissolved, with stirring, the solution was charged into an ISCO pump and metered into the reactor.

The catalyst feed rate was controlled along with the monomer feed rates and reaction temperature, as shown in Tables 1A and 1B, to produce the polymers also described in Table 1A and 1B. Reactor pressure was 1600 psig and scavenger feed rate is 0.015 kg/hr for all runs. The reactor product stream was treated with trace amounts of methanol to halt the polymerization. The mixture was then freed from solvent via a low-pressure flash separation, treated with Irganox™ 1076 then subjected to a devolatilizing extruder process. The dried polymer was then pelletized.

Polymerization reaction conditions and catalyst used are set forth below in Table 1A and 1B.

TABLE 1A

Ethylene-propylene-ENB polymerization run conditions.

| Polymer | Rxr T (° C.) | C2 Feed rate (kg/hr) | C3 Feed Rate (kg/hr) | ENB Feed Rate (kg/hr) | Catalyst Solution Feed Rate (mL/min) | Catalyst concentration (g/L) | Co-Catalyst concentration (g/L) | Isohexane Feed Rate (kg/hr) | $H_2$ Feed Rate (sccm) | Residence Time (min) |
|---|---|---|---|---|---|---|---|---|---|---|
| PEDM A | 95.0 | 0.67 | 26.41 | 0.74 | 3.187 | 0.25 | 0.69 | 58.02 | 54 | 12.6 |
| PEDM B | 100.0 | 1.52 | 26.70 | 0.75 | 1.821 | 0.25 | 0.69 | 61.56 | 87 | 11.9 |
| PEDM C | 100.0 | 1.75 | 19.49 | 0.60 | 0.390 | 1.00 | 2.75 | 54.92 | 136 | 20.3 |

TABLE 1B

Ethylene-propylene-ENB polymerization runs conditions.

| Polymer | % C2 = Conversion | % C3 = Conversion | % ENB Conversion | Polymer Rate (kg/h) | Cat Efficiency (g poly/g cat) |
|---|---|---|---|---|---|
| PEDM A | 75.6 | 27.5 | 34.5 | 8.01 | 166,000 |
| PEDM B | 62.8 | 28.0 | 34.1 | 8.70 | 315,000 |
| PEDM C | 63.6 | 30.4 | 42.6 | 7.34 | 291,000 |

Characterization of the PEDM A, PEDM B, and PEDM C samples are provided in Table 2 below. All three samples were amorphous with about zero crystallinity Polymers:

Table 2 illustrates the polymer characteristics of example EP(D)M and PEDM polymers. The reference polymer VISTALON™ 706 is an ethylene-propylene copolymer having a Mooney Viscosity (ML, 1+4@ 125° C.) of 42 MU and an ethylene content of 65 wt %. VISTALON™ 9301 is an EP(D)M terpolymer with a higher Mooney Viscosity than VISTALON™ 706 (specifically, 67 MU (ML, 1+4@ 125° C.)), and with ENB as the diene. PEDM polymers (A, B, and C) of Table 2 have an ethylene content ranging from 35 wt % (PEDM A) to 15 wt % (PEDM C), ENB content of 3 wt % and MFR of 7.5 g/10 min (230° C., 2.16 kg. The glass transition temperature (Tg) of the PEDM terpolymers was measured using dynamic mechanical thermal analysis (DMTA) in accordance with the procedures previously described. The PEDM samples' Tg decreased with increasing ethylene content. The PEDM polymers were synthesized using dimethylsilylene(2,6,6-trimethyl-1,5,6,7-tetrahydro-s-indacen-1-yl)(tert-butylamido)titanium dimethyl and activator: N,N-dimethylanilinium tetrakis(perfluoronaphthyl)borate.

TABLE 2

Polymer Compositions

| Polymer | Mooney Viscosity (1 + 4) 125° C. (MU) | Ethylene Content (wt %) | ENB Content (wt %) | Melt Flow Rate (g/10 min) | Tg (° C.) |
|---|---|---|---|---|---|
| VISTALON ™ 706 | 42 | 65 | 0 | — | — |
| PEDM A | — | 4.9 | 2.7 | 6.7 | −2.0 |
| PEDM B | — | 10.1 | 2.7 | 7.2 | −9.0 |
| PEDM C | — | 15.3 | 2.8 | 6.8 | −15.2 |

Compositions:

Compositions comprising EP(D)M polymer, carbon black, oil and curatives were prepared in a KRUPP™ internal mixer. Table 3 shows the representative compositions. A mix was adopted for compounding using a fill factor of 70%. At the start of mixing, polymer, carbon black and additives were introduced with the rotor speed at 50 rpm. The ram was raised three times during the mixing cycle. Mixing was continued for 5 minutes at which time the batch was discharged. The temperature of the discharged batch on an average was about 250° F. About 5 grams of the compound master batch was isolated for rheology measurements.

TABLE 3

Blend Compositions and Conditions

| Example | C1 | E2 | E3 | E4 | E5 | E6 | E7 | E8 | E9 | E10 | E11 | E12 | E13 |
|---|---|---|---|---|---|---|---|---|---|---|---|---|---|
| VISTALON ™ 706 | 100 | 95 | 90 | 85 | 80 | 95 | 90 | 85 | 80 | 95 | 90 | 85 | 80 |
| PEDM A | | 5 | 10 | 15 | 20 | | | | | | | | |
| PEDM B | | | | | | 5 | 10 | 15 | 20 | | | | |
| PEDM C | | | | | | | | | | 5 | 10 | 15 | 20 |

| Component | Density | Phr |
|---|---|---|
| First Pass | | |
| Polymer | 0.864 | 100 |
| Black 330 | 1.800 | 60 |
| DYMALINK ™ 708 | 1.500 | 15 |
| SUNPAR ™ 2280 | 0.899 | 10 |
| Zinc Oxide | 5.610 | 5.0 |
| Zinc Stearate | 1.100 | 2.0 |
| AGERITE ™ RESIN D ™ | 1.060 | 1.0 |
| Second Pass (entire batch) | | |
| VULCUP ™ 40 KE | 1.500 | 5.0 |
| DYMALINK ™ 719 | 1.050 | 0.3 |
| Specific Gravity | | 1.117 |
| Total phr Master Batch | | 193.0 |
| Total phr | | 198.3 |
| Batch Factor | | 1.62 |
| Batch Wt. | | 320.7 |
| Fill Factor (%) | | 70 |
| Mixer Volume (cc) | | 1600 |

1$^{st}$ Pass Master batch 50 rpm
0-Add polymer, black, oil, etc.
Sweep @ 140° F.
Sweep @ 200° F.
Sweep @ 240° F.
Ram 60 psi Dump Temperature (° F)                300 (average)

The curatives were added to the master batch on the second pass through the KRUPP™ internal mixer. The batch was passed several times through the mill to ensure a homogeneous dispersion of the curatives. The batches containing the curatives were cured in an electric press and tested for various physical and mechanical properties.

In Table 3, "Polymer" indicates the respective amount of VISTALON™ 706 polymer (plus PEDM polymer as in Examples E2-E13) included in the composition; Black 330 is a carbon black (pellet form available from Cabot); SUNPAR™ 2280 is a paraffinic process oil; Zinc Stearate and ZnO (zinc oxide) are vulcanization activators; AGERITE™ RESIN D™ is the antioxidant 1,2-dihydro-2,2,4-trimethylquinoline (available from Vanderbilt Chemicals); DYMALINK™ 708 (ZDMA) and DYMALINK™ 719 are each vulcanization activators; and VULCUP™ 40 KE is an organic peroxide vulcanizing/crosslinking agent. The composition is considered a useful composition for EP(D)M compounds, and therefore is taken as useful for testing the processability of Examples E2-E13 as compared to comparative Example $C_1$.

The composition was mixed according to the following procedure to form an elastomeric composition. Polymer and other components in the "First Pass" section of Table 3 were added to a 1600 cc Banbury-type tangential internal mixer (available from Farrel Corporation) at 0'00" and 0'30", respectively, and operation of the mixer carried out for 3 minutes as shown in Table 4 below for "First Pass" parameters (specifically, operation at 90 RPM, 70° C.). The ram was then raised up, mixing continued for 15 more seconds, and the "First Pass" components were dumped and passed as second time through the KRUPP™ internal mixer with the "Second Pass" components of Table 3.

TABLE 4

| Mixer Operation for Examples C1 and E2-E13 Compound Formation | |
|---|---|
| Conventional - 2 pass | |
| Farrel mixer - NCV 1600 cc - Banbury type | |
| Loading: 70% NCV | |
| Ram pressure: 2 kg | |
| Rotor speed: 90 RPM (First Pass)/70 RPM (Second Pass) | |
| Mixer start temperature: 70° C. (First Pass)/30° C. (Second Pass) | |
| Mixing time: 3'15" (First Pass)/1' (Second Pass) | |
| Time: | Action: |
| 0'00" | Add Polymer, ram down |
| 0'30" | Add remaining "first pass" components sweep at 90° C. sweep at 105° C. |
| 3'00" | Ram up |
| 3'15" | Dump (damp temperature: 250° F.) |

Rubber-to-Rubber Tack Testing:

The rubber-to-rubber tack testing was carried out based on Modified ASTM D3330/D330M-04(2010) Method F. In particular, the following modifications to the ASTM method were utilized: (1) instead of a 2μ finish stainless steel substrate per the ASTM method, an uncured rubber sheeting substrate was used and (2) for conditioning, instead of the 24 hours at 23° C. in the ASTM method, the sample was conditioned for 1 minute at the test temperature. This method provides the benefit of a larger test area and longer dwell time, thus providing more extensive testing of the sample versus the Tel-Tak method.

Example 1

Figure 4:
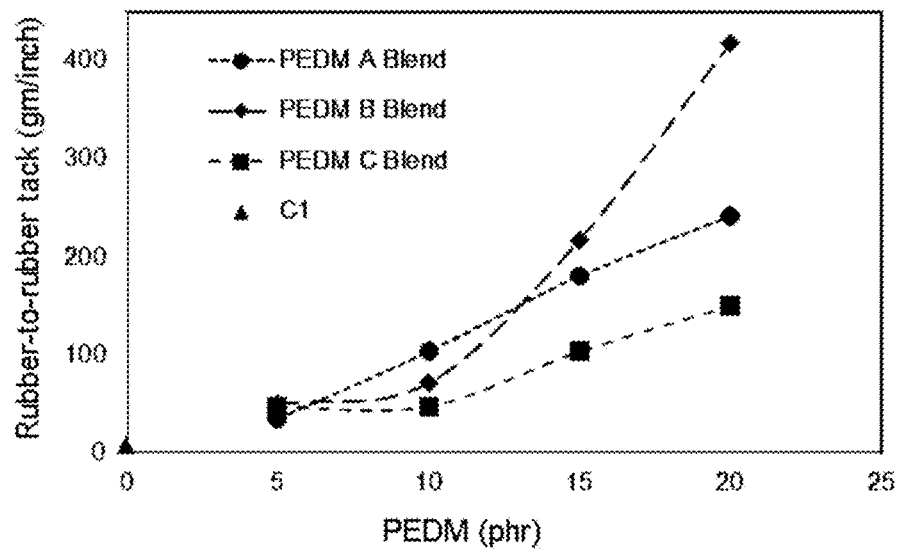
FIG. 4 is a graph illustrating the rubber-to-rubber tack for various compositions in accordance with various embodiments of the present disclosure.

FIG. 4 is a graph illustrating the rubber-to-rubber tack for various compositions in accordance with various embodiments of the present disclosure. The peak force is higher in the PEDM A and PEDM B formulations respectively when compared to the compounds with PEDM C. These differences are particularly significant at the 15 phr and 20 phr levels. The high rubber-to-rubber tack in the E8 and E9 formulations is quite unexpected. The maximum value of around 400 gm/inch seen in the E9 formulation is comparable to the tack properties of un-aged polychloroprene formulations.

Figure 5:
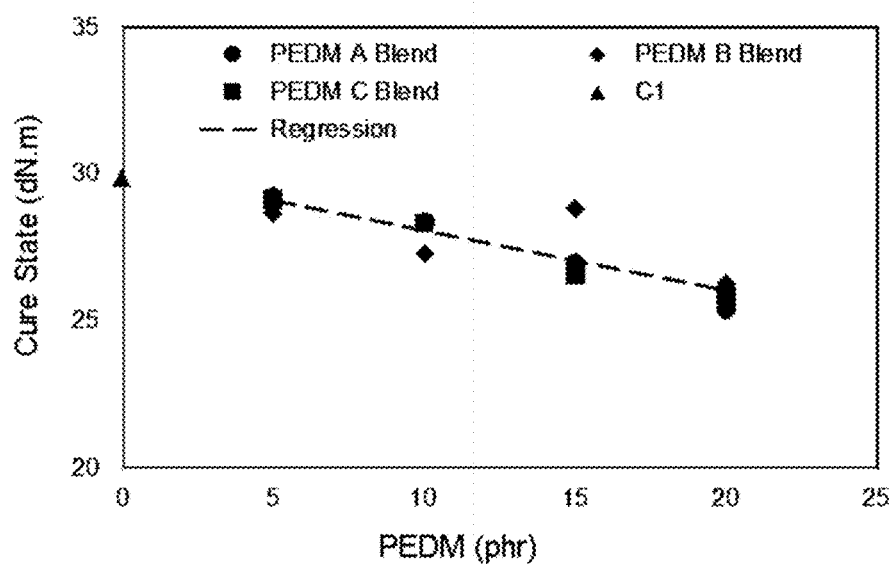
FIG. 5 is a graph illustrating the cure state for various compositions in accordance with various embodiments of the present disclosure
Figure 6:
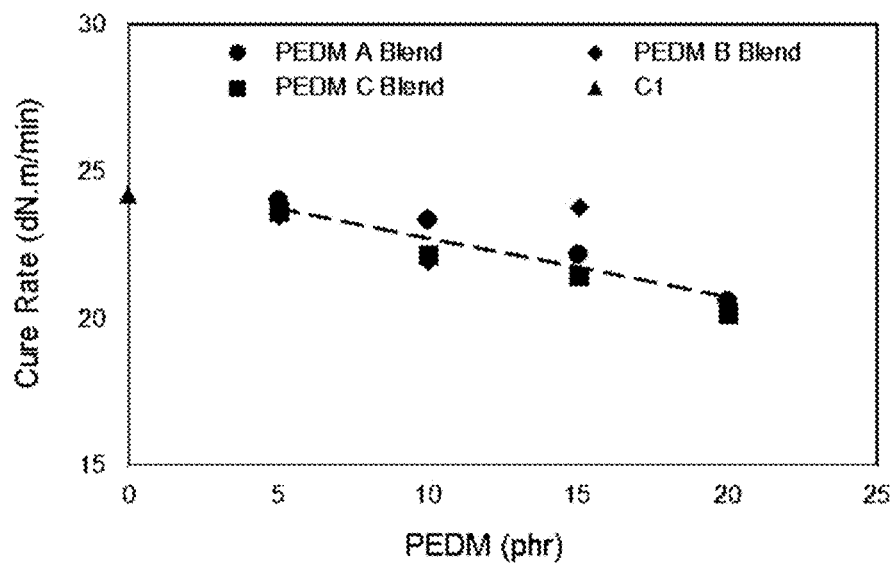
FIG. 6 is a graph illustrating the cure rate for various compositions in accordance with various embodiments of the present disclosure.

FIG. 5 is a graph illustrating the cure state for various compositions in accordance with various embodiments of the present disclosure. The cure state of the reference C1 is shown for reference (triangle). The cure state decreases with higher levels of PEDM in the formulation. There is no specific dependence of cure state with the ethylene content of the PEDM polymer, which is established by the regression model (dash line). At 20 phr PEDM, the cure state is still over 80% of the reference C1. FIG. 6 is a graph illustrating the cure rate for various compositions in accordance with various embodiments of the present disclosure. The trend is very similar to cure state dependence shown in FIG. 5.

Figure 7:
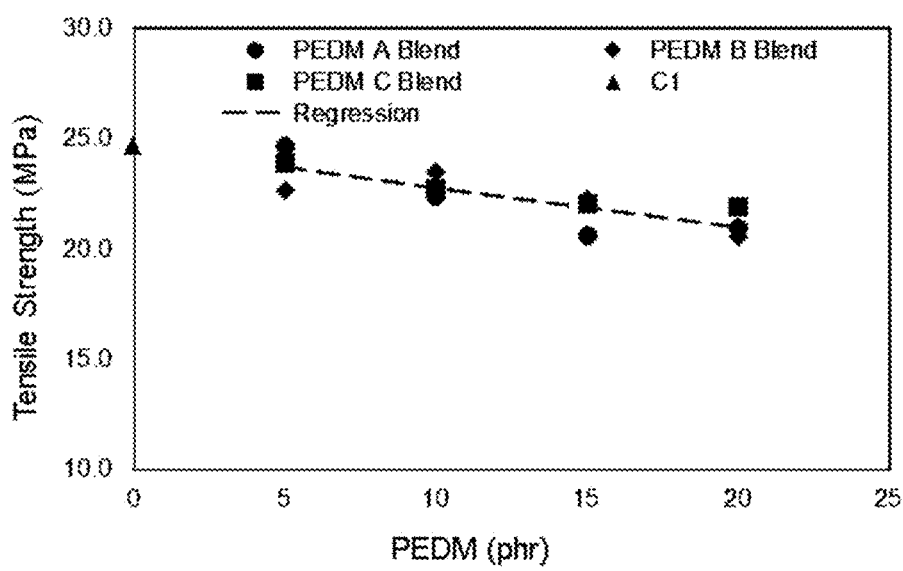
FIG. 7 is a graph illustrating the tensile strength for various compositions in accordance with various embodiments of the present disclosure.
Figure 8:
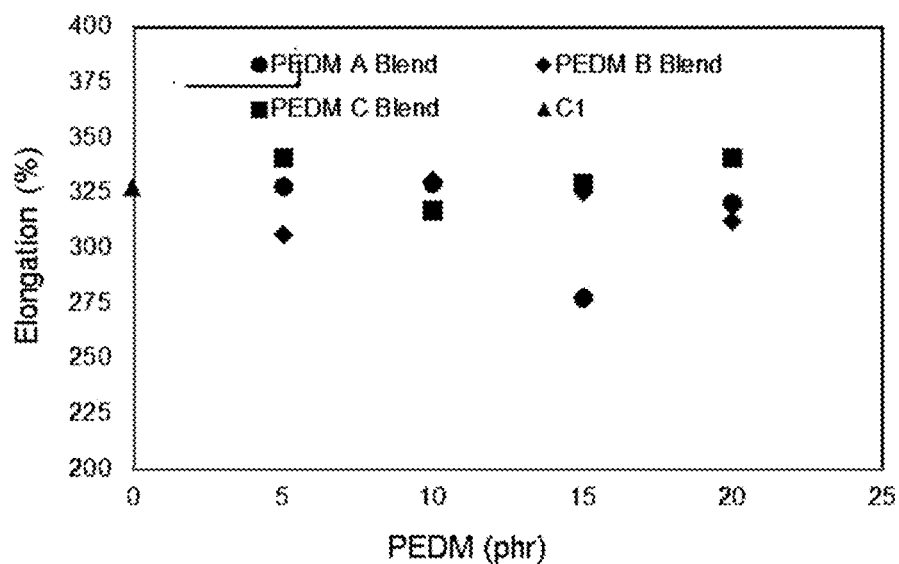
FIG. 8 is a graph illustrating the elongation to break for various compositions in accordance with various embodiments of the present disclosure.

FIG. 7 is a graph illustrating the tensile strength for various compositions in accordance with various embodiments of the present disclosure. The tensile strength of the reference C1 is also shown for reference. The tensile strength decreases at higher levels of PEDM in the formulation. There is no specific dependence of tensile strength with the ethylene content of the PEDM polymer. At 20 phr PEDM (E5, E9, and E13 formulations), the tensile strength is still over 80% of the reference C1. FIG. 8 is a graph illustrating the elongation to break for various compositions in accordance with various embodiments of the present disclosure. The elongation to break remains almost unchanged around 325%, which is comparable to the reference C1.

Figure 9:
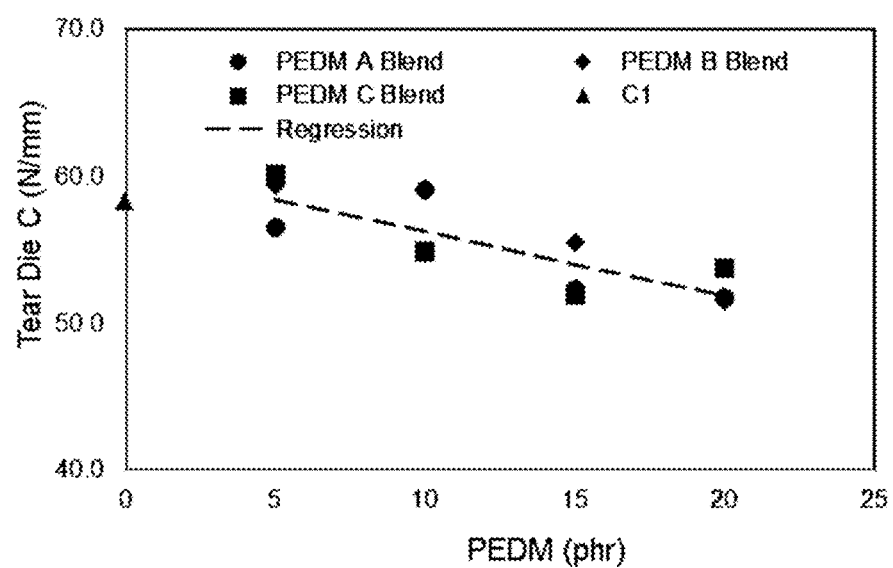
FIG. 9 is a graph illustrating the tear strength (Die C tear) for various compositions in accordance with various embodiments of the present disclosure.

FIG. 9 is a graph illustrating the tear strength (Die C tear) for various compositions in accordance with various embodiments of the present disclosure. The tear strength decreases at higher PEDM loadings; but is still over 80% of the reference C1 at the 20 phr loading (i.e., E5, E9, and E13 formulations).

Figure 10:
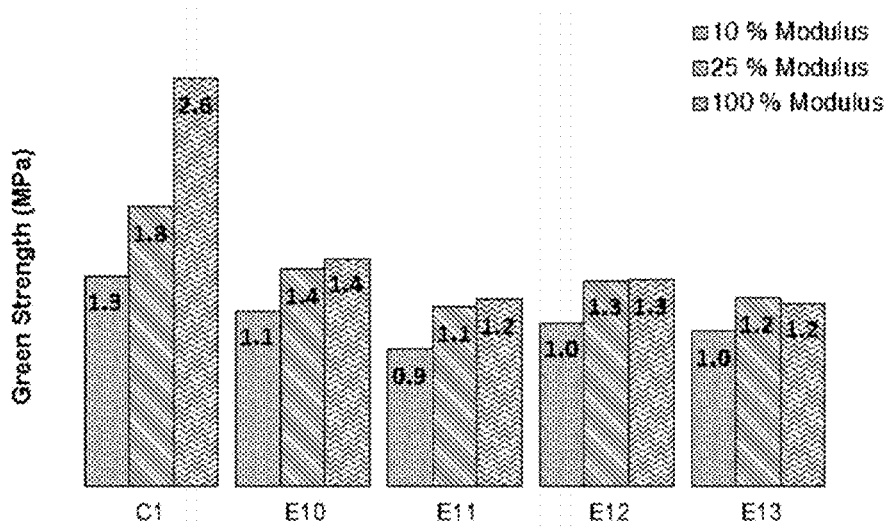
FIG. 10 is a graph illustrating the green strength of various uncured compositions in accordance with various embodiments of the present disclosure.

FIG. 10 is a graph illustrating the green strength of the uncured formulations that use PEDM C (15% ethylene) (i.e., E10-E13 formulations) in accordance with various embodiments of the present disclosure. The green strength, represented by modulus, is defined as the stress at a specific extension. For example 10% modulus, corresponds to the tensile stress at 10% extension for the uncured compound. Addition of PEDM reduces the green strength in relation to the reference C1. However, the change for 25% modulus, which is typically used for green strength measurement, drops only marginally from a value of 1.8 MPa in the reference C1 to 1.4 MPa in the E10 formulation (15% ethylene-PEDM at 5 phr of the rubber) and to 1.2 MPa in the E13 formulation (15% ethylene-PEDM at 20 phr of the rubber).

Figure 11:
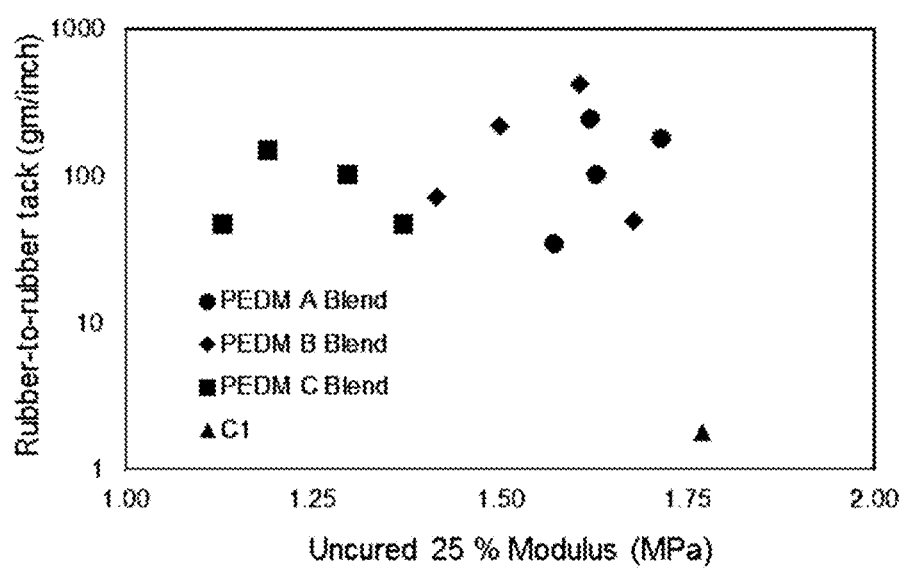
FIG. 11 is a graph illustrating the rubber-to-rubber tack to green strength balance for various compositions in accordance with various embodiments of the present disclosure.

FIG. 11 is a graph illustrating the rubber-to-rubber tack to green strength balance for various compositions in accordance with various embodiments of the present disclosure. In relation to the reference C1 formulation the rubber-to-rubber tack is increased by an order of magnitude, with a marginal trade-off in green strength in some of the examples; especially in the formulations using PEDM A and PEDM B.

Figure 12:
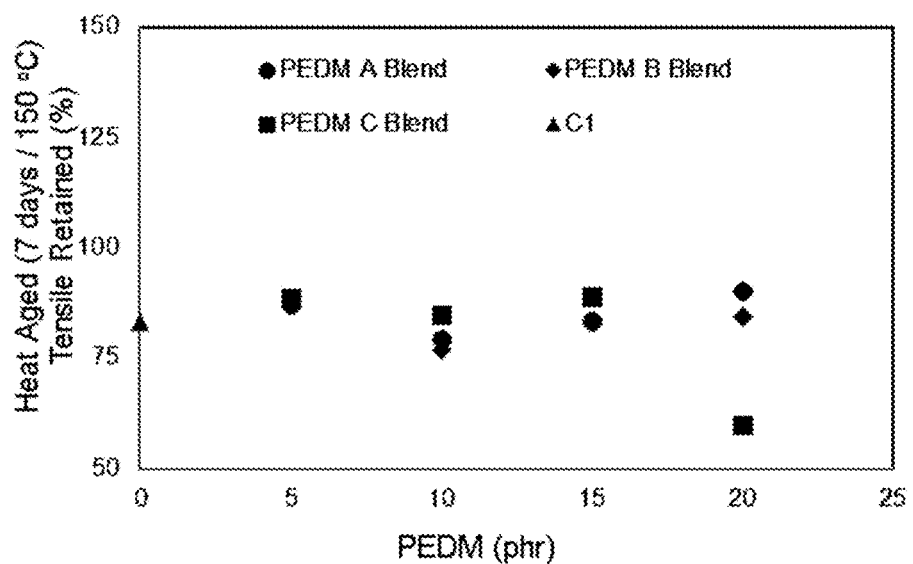
FIG. 12 is a graph illustrating the tensile strength retention of various heat aged compositions in accordance with various embodiments of the present disclosure.
Figure 13:
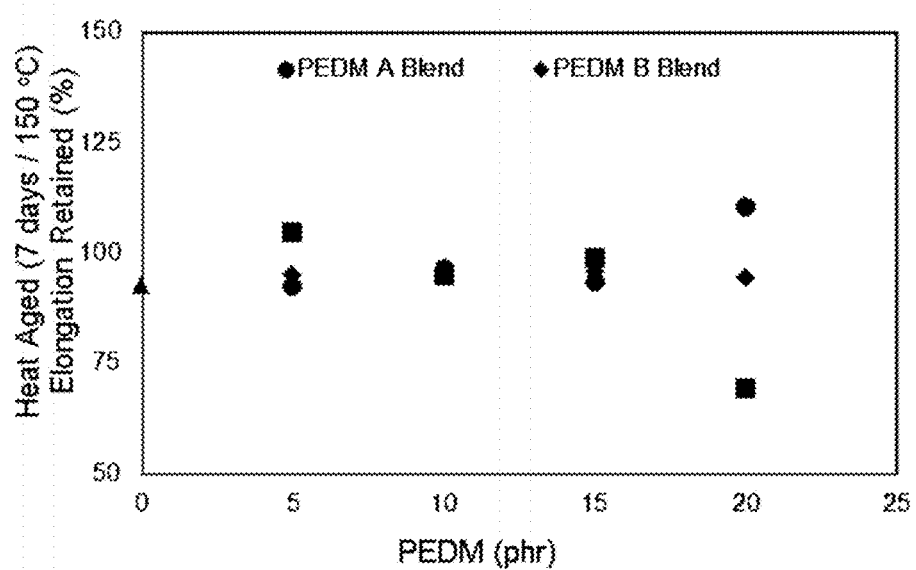
FIG. 13 is a graph illustrating the elongation retention of various heat aged compositions in accordance with various embodiments of the present disclosure.

The heat aged properties of the formulations containing PEDM polymers are illustrated in FIG. 12 (tensile strength retention) and FIG. 13 (elongation retention), respectively.

The samples were subjected to heat ageing at 150° C. for a period of 7 days. The properties are noted as a percent of the original tensile strength or elongation. As seen in the figures the tensile strength and elongation retention is similar to the reference C1 formulation. This is consistent across PEDM ethylene content and levels in the formulation.

Table 5 shows compound properties of the C1, E4, E5, E8, E9, E12, and E13 formulations. Addition of PEDM results in a drop of compound Mooney viscosity, which is beneficial for processability. The Mooney Scorch at 125° C. (t1 and t5) are by and large un-affected by the inclusion of PEDM polymer in relation to the control.

TABLE 5

| Blend Compositions and Properties | | | | | | | | |
|---|---|---|---|---|---|---|---|---|
| Example | | C1 | E4 | E5 | E8 | E9 | E12 | E13 |
| VISTALON ™ 706 | | 100 | 85 | 80 | 85 | 80 | 85 | 80 |
| PEDM A | | | 15 | 20 | | | | |
| PEDM B | | | | | 15 | 20 | | |
| PEDM C | | | | | | | 15 | 20 |
| Compound Viscosity ML (1 + 4) 100° C. | MU | 77 | 70 | 68 | 69 | 67 | 66 | 60 |
| Mooney Scorch at 125° C. | | | | | | | | |
| t1 | min | 22 | 24 | 25 | 22 | 25 | 23 | 21 |
| t5 | min | 47 | 49 | 53 | 48 | 51 | 45 | 47 |
| MDR 180° C., 0.5 deg | | | | | | | | |
| ML | dN · m | 1.8 | 1.8 | 1.8 | 2.0 | 1.4 | 1.6 | 1.6 |
| MH | dN · m | 31.7 | 28.7 | 27.2 | 30.8 | 27.7 | 28.2 | 27.4 |
| MH-ML | dN · m | 29.9 | 27.0 | 25.4 | 28.8 | 26.3 | 26.6 | 25.8 |
| ts2 | min | 0.4 | 0.5 | 0.5 | 0.5 | 0.5 | 0.5 | 0.5 |
| t20 | min | 0.6 | 0.6 | 0.6 | 0.6 | 0.6 | 0.6 | 0.6 |
| t40 | min | 0.9 | 1.0 | 1.0 | 0.9 | 1.0 | 0.9 | 1.0 |
| t80 | min | 2.7 | 2.8 | 2.8 | 2.7 | 2.9 | 2.8 | 2.8 |
| Peak Rate | dN · m/min | 24.2 | 22.2 | 20.6 | 23.8 | 20.3 | 21.4 | 20.1 |
| Press Cure, 30 min at 180° C. | | | | | | | | |
| Stress at 100% Strain | MPa | 5.5 | 5.7 | 5.4 | 5.6 | 5.4 | 5.6 | 5.3 |
| Stress at 200% Strain | MPa | 14.4 | 14.0 | 13.2 | 13.9 | 13.1 | 14.0 | 13.0 |
| Stress at 300% Strain | MPa | 22.9 | 21.9 | 19.7 | 21.3 | 19.9 | 20.6 | 20.3 |
| Tensile Strength | MPa | 24.6 | 20.6 | 20.9 | 22.2 | 20.5 | 22.0 | 21.9 |
| Elongation | % | 327 | 278 | 320 | 325 | 312 | 329 | 340 |
| Die C Tear | N/mm | 58 | 52 | 52 | 55 | 51 | 52 | 54 |
| Green Tensile Properties (23° C.) | | | | | | | | |
| Stress at 10% Elong. | MPa | 1.3 | 1.4 | 1.3 | 1.2 | 1.3 | 1.0 | 1.0 |
| Stress at 25% Elong. | MPa | 1.8 | 1.7 | 1.6 | 1.5 | 1.6 | 1.3 | 1.2 |
| Stress at 100% Elong. | MPa | 2.6 | 1.9 | 1.7 | 1.6 | 1.8 | 1.3 | 1.2 |
| Oven Aged-7 Days at 150° C. | | | | | | | | |
| Tensile Strength | MPa | 20.4 | 18.5 | 18.2 | 18.7 | 18.1 | 13.1 | 18.4 |
| Elongation | % | 303 | 306 | 305 | 307 | 327 | 228 | 318 |
| Tensile Retained | % | 83 | 90 | 87 | 84 | 88 | 60 | 84 |
| Elongation Retained | % | 92 | 110 | 95 | 94 | 105 | 69 | 94 |

Example 2

The effects of mixing orders were investigated using the reference C1 formulation and blended formulations with PEDM B (see Example 1). More specifically, the control compound (C2) containing VISTALON™ 706 was prepared in two pass where the VISTALON™ 706 without the curatives compounded in the first pass to produce a C1 master batch, then the peroxide cure system was added to the C1 master batch in the second pass. The blended formulations with PEDM B were prepared in two different methods.

The first formulation (E14) was prepared with a first pass method where the PEDM B was mixed along with the EP copolymer and other additives (except curatives and crosslinking agents per Table 3) in the first pass. Then, the curatives were added in the second pass to the compound made in the first pass.

In an alternate method designated herein as a second pass method, a second formulation (E15) was prepared where the VISTALON™ 706 and other additives (except curatives and crosslinking agents) were compounded in the first pass. Then, the PEDM B and the curatives were added in the second pass to the compound prepared in the first pass.

The samples were prepared in a KRUPP™ internal mixer (1600 cc volume, 70% fill factor, see Example 1). The average discharge temperature from the mixer was about 350° F.

Figure 14:
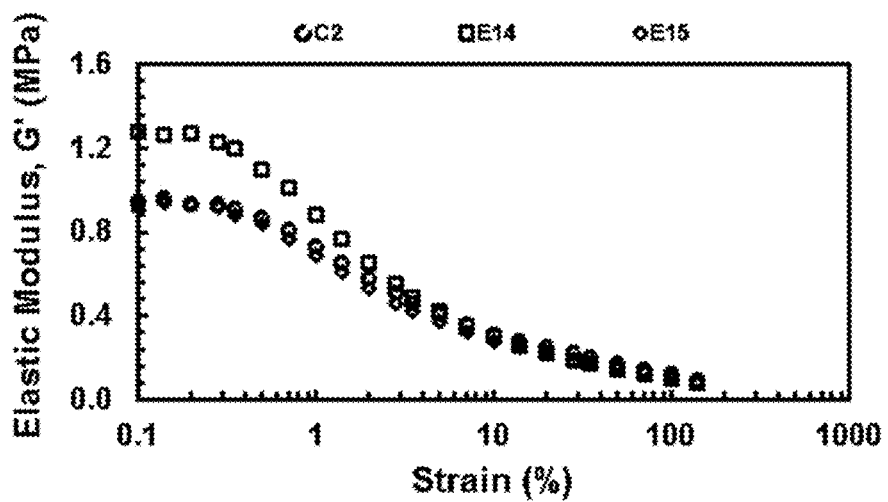
FIG. 14 is a graph illustrating the elastic modulus plotted with increasing strain amplitude various compositions in accordance with various embodiments of the present disclosure.

FIG. 14 is a graph illustrating the elastic modulus plotted with increasing strain amplitude for the C2, E14, and E15 formulations. The E14 formulation shows increased Payne effect (Payne, A. R., J Applied Polymer Science, 6 (19) 57-63), with higher elastic modulus at low strain (0.1%); indicative of enhanced filler-filler interaction caused by filler agglomeration. In contrast, the E15 formulation has a much reduced Payne effect, where the modulus dependence on strain being very similar to the reference C2.

The PEDM polymer has a lesser affinity for carbon black relative to the higher ethylene content EP copolymer. Adding them together (E14 formulation), precludes to some extent the association of the black with the EP copolymer. When the PEDM B added separately in a second step (E15 formulation), the association of the black with the EP copolymer is not hindered by the PEDM, resulting in better dispersion. As described above, it also possible, though not shown here, to add the PEDM polymer in the first pass itself after carbon black is incorporated into the EP copolymer. Sufficient carbon black incorporation is evident using a torque versus time curve generated during mixing, where the black incorporation time (BIT) is defined as the time associated with the maximum in torque where the carbon black is incorporated with the polymer and is subsequently dispersed. Adding the PEDM in the dispersion stage after BIT, when the black is fully incorporated, would be analogous to adding PEDM in the second pass.

Figure 15:
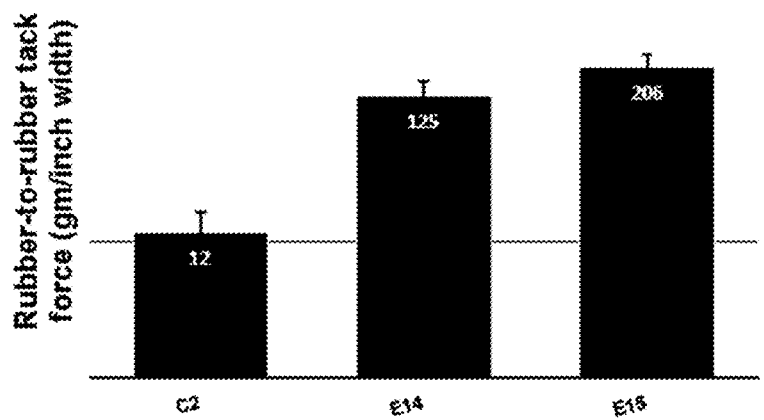
FIG. 15 is a graph illustrating the rubber-to-rubber tack for various compositions in accordance with various embodiments of the present disclosure.

FIG. 15 is a graph illustrating the rubber-to-rubber tack test for the three compounds. A minimum of five replicates were tested for each compound. The bar charts represent the average value, while the error bars indicate the standard deviation. The y-axis is plotted on a log scale. The C2 formulation shows no tack (below the range of the instrument detection limit). The E14 (first pass) formulation shows a tack value of 125 gm force/inch width. The tack increases further to 206 gm force/inch width when the second pass blending is used (E15 formulation). Changing the blending order to a second pass method increased the tack value 65% over the first pass method.

Figure 16:
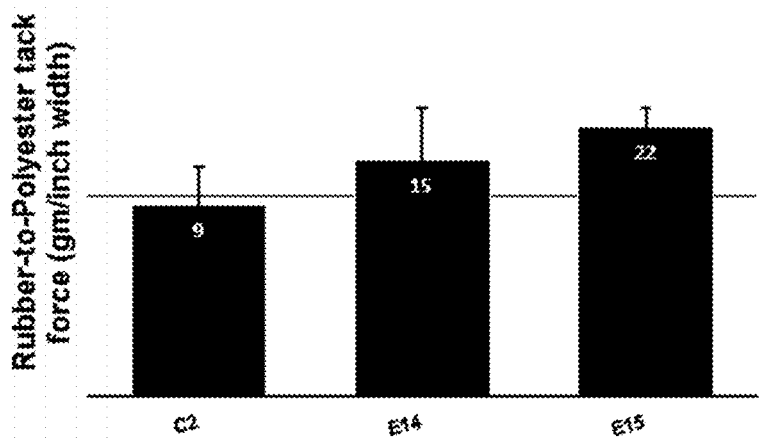
FIG. 16 is a graph illustrating the rubber-to-polyester fabric tack for various compositions in accordance with various embodiments of the present disclosure.
Figure 17:
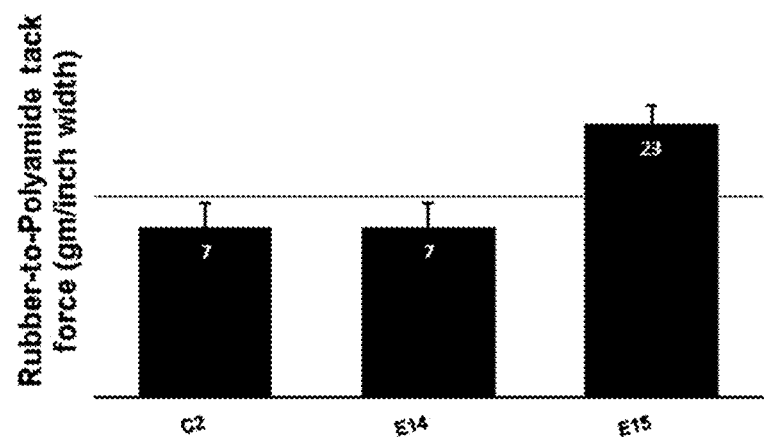
FIG. 17 is a graph illustrating the rubber-to-polyamide tack for various compositions in accordance with various embodiments of the present disclosure.

The tack to other compositions was tested using the previously described rubber-to-rubber tack procedure where the rubber substrate was replaced by either polyester fabric or polyamide contact surface of 20 mil thickness on the top. FIG. 16 is a graph illustrating the rubber-to-polyester fabric tack, while FIG. 17 is a graph illustrating the rubber-to-polyamide tack. The bar charts represent the average value, while the error bars indicate the standard deviation. The y-axis is shown on a log scale. The C2 formulation shows no tack to either the polyester fabric or the polyamide substrate. The second pass E15 formulations shows the highest improvement in tack with both the polyester and polyamide substrates, with tack force exceeding 20 gm/inch width, which is a significant improvement over 7 gm/inch width.

Overall, compositions of the present disclosure comprise from 5 phr to 40 phr of a PEDM terpolymer having from 0.5 to 5 wt % diene, 5 to 20 wt % ethylene, and 75 to 95 wt % propylene, said wt % based on the weight of the PEDM terpolymer; and from 60 phr to 95 phr of an ethylene-based copolymer comprising an ethylene content different than the first polymer (based on the weight of the ethylene-based copolymer), a $C_3$ to $C_{12}$ α-olefin, and, optionally, one or more dienes. Compositions of the present disclosure can have a green strength 25% modulus of about 1.7 MPa or greater. Compositions of the present disclosure can have a tensile strength at break of 21.4 MPa or greater. Compositions of the present disclosure can have a tack of at least about 3.4 kPa, such as at least about 5.5 kPa. Transmission belts of the present disclosure comprise one or more compositions of the present disclosure having one or more advantageous properties described herein to provide new and improved transmission belts and new and improved formation of transmission belts.

All documents described herein are incorporated by reference herein, including any priority documents and/or testing procedures to the extent they are not inconsistent with this text. As is apparent from the foregoing general description and the specific embodiments, while some embodiments have been illustrated and described, various modifications can be made without departing from the spirit and scope of the disclosure. Accordingly, it is not intended that the disclosure be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

What is claimed is:

1. An elastomeric composition comprising:
    from 5 to 40 parts by weight per hundred parts by weight rubber (phr) of a propylene-α-olefin-diene (PEDM) terpolymer comprising 75 to 95 wt % propylene, 5 to 20 wt % α-olefin, and 0.5 to 5 wt % diene, said wt % based on the weight of the PEDM terpolymer, wherein the PEDM terpolymer has an $H_f$ less than half 1 J/g; and
    from 60 to 95 phr of an ethylene-based copolymer comprising ethylene, one or more $C_3$ to $C_{12}$ α-olefins, and, optionally, one or more dienes; wherein an ethylene-based copolymer comprises 40 to 95 wt % ethylene, 0 to 10 wt % of one or more dienes, and a $C_3$ to $C_{12}$ α-olefin, said wt %s based on a total weight of the ethylene-based copolymer.

2. The elastomeric composition of claim 1, wherein the PEDM terpolymer comprises two or more propylene-based copolymers.

3. The elastomeric composition of claim 1, wherein the ethylene-based copolymer comprises two or more ethylene-based copolymers.

4. The elastomeric composition of claim 1, wherein the PEDM terpolymer comprises two or more propylene-based copolymers and the ethylene-based copolymer comprises two or more ethylene-based copolymers.

5. The elastomeric composition of claim 1, wherein the PEDM terpolymer is formed by polymerizing propylene, ethylene, and diene in the presence of a catalyst compound represented by formula (I):

$$T_y Cp'_m MG_n X_q \qquad (I),$$

wherein:
Cp' is a tetrahydroindacenyl group which is optionally substituted or unsubstituted, provided that when Cp' is tetrahydro-s-indacenyl: 1) the 3 and/or 4 positions are not aryl or substituted aryl, 2) the 3 position is not directly bonded to a group 15 or 16 heteroatom, 3) there are no additional rings fused to the tetrahydroindacenyl group, 4) T is not bonded to the 2-position, and 5) the 5, 6, or 7-position is generally disubstituted;
M is a group 3, 4, 5, or 6 transition metal;
T is a bridging group;
y is 0 or 1, indicating the absence or presence of T;
G is a heteroatom group represented by the formula $JR^i_{z-y}$ where J is N, P, O or S, $R^i$ is a $C_1$ to $C_{100}$ hydrocarbyl group, and z is 2 when J is N or P, and z is 1 when J is O or S;
X is a leaving group; and
m=1; n=1, 2 or 3; q=1, 2 or 3; and the sum of m+n+q is equal to the oxidation state of the transition metal.

6. The composition of claim 1, wherein the composition has a rubber-to-rubber tack force exceeding 150 g of force/inch width.

7. The composition of claim 1, wherein the diene of the PEDM terpolymer is one or more of 5-ethylidene-2-norbornene, dicyclopentadiene, 5-vinyl-2-norbornene, 1,4-hexadiene, alkyldicyclopentadiene, 1,4-pentadiene, 1,5-hexadiene, 1,4-heptadiene, 2-methyl-1,5-hexadiene, cyclooctadiene, 1,4-octadiene, 1,7-octadiene, 5-n-propylidene-2-norbornene, 5-(2-methyl-2-butenyl)-2-norborene, or norbornadiene.

8. The elastomeric composition of claim 7, wherein the diene of the PEDM terpolymer is 5-ethylidene-2-norbornene.

9. The elastomeric composition of claim 1, wherein the one or more $C_3$ to $C_{12}$ α-olefin of the ethylene-based copolymer is propylene or 1-butene.

10. The elastomeric composition of claim 1, wherein the one or more $C_3$ to $C_{12}$ α-olefin of the ethylene-based copolymer is propylene.

11. The elastomeric composition of claim 1, further comprising carbon black at 1 phr to 500 phr.

12. The elastomeric composition of claim 1, wherein the PEDM terpolymer has a crystallinity of ≤5%.

13. An at least partially crosslinked elastomeric composition that is the reaction product of:
the elastomeric composition according to claim 1;
one or more vulcanization activators; and
one or more vulcanizing agents.

14. The at least partially crosslinked elastomeric composition of claim 13, comprising from 1 phr to 150 phr of a paraffinic process oil, the paraffinic process oil having a viscosity at 40° C. within a range from 80 to 600 CSt.

15. The composition of claim 1 having one or more of the following properties:
(a) a tack of about 4,000 Pa or greater;
(b) a green strength 25% modulus of about 1.7 MPa or greater; and
(c) a tensile strength at break of 21.4 MPa or greater.

16. A belt comprising the elastomeric composition according to claim 1.

17. An article comprising the elastomeric composition of claim 1, wherein the composition adheres to at least one polyester substrate selected from the group consisting of: a polyester film, a polyester cord, a polyester woven fabric, and a polyester nonwoven fabric.

18. The elastomeric composition of claim 1, further comprising an additive selected from the group consisting of: a filler, a process oil, a plasticizer, a compatibilizer, a crosslinker, and any combination thereof.

19. A method of producing the elastomeric composition of claim 1 comprising the steps of:
producing a master batch at a first temperature, the master batch comprising the ethylene-based copolymer, the PEDM terpolymer, and an additive;
mixing a curative and/or a crosslinking agent into the master batch at a second temperature that is lower than the first temperature; and
recovering the elastomeric composition.

20. The method of claim 19, wherein producing the master batch comprises mixing the ethylene-based copolymer and the additive until the additive is incorporated before adding the PEDM terpolymer in a single pass.

21. The method of claim 20, wherein producing the master batch comprises:
mixing in a first pass the ethylene-based copolymer and the additive until the additive is incorporated; and
mixing in a second pass the PEDM terpolymer with a curative and/or a cros slinking agent into a product of the first pass.

22. The method of claim 19, wherein the additive comprises at least one selected from the group consisting of: paraffinic oil, zinc oxide, and zinc stearate.

* * * * *